(12) United States Patent
Hyun

(10) Patent No.: US 9,101,120 B2
(45) Date of Patent: Aug. 11, 2015

(54) FISHING REEL HAVING CENTRIFUGAL BRAKE SYSTEM

(71) Applicant: DOYO ENGINEERING CO., LTD., Bucheon (KR)

(72) Inventor: Kwang-Ho Hyun, Bucheon (KR)

(73) Assignee: DOYO ENGINEERING CO., LTD. (KR)

( * ) Notice: Subject to any disclaimer, the term of this patent is extended or adjusted under 35 U.S.C. 154(b) by 17 days.

(21) Appl. No.: 13/887,549

(22) Filed: May 6, 2013

(65) Prior Publication Data

US 2013/0292504 A1 Nov. 7, 2013

(30) Foreign Application Priority Data

May 4, 2012 (KR) .................. 10-2012-0047428

(51) Int. Cl.
*A01K 89/01* (2006.01)
*A01K 89/0155* (2006.01)

(52) U.S. Cl.
CPC ....... *A01K 89/0155* (2013.01); *A01K 89/01555* (2013.01)

(58) Field of Classification Search
CPC .................. A01K 89/0155; A01K 89/01555
USPC .................. 242/289, 288; 188/180, 181 A
See application file for complete search history.

(56) References Cited

U.S. PATENT DOCUMENTS

| | | | |
|---|---|---|---|
| 4,390,140 A * | 6/1983 | Karlsson et al. | 242/289 |
| 4,718,617 A * | 1/1988 | Vadasz et al. | 242/243 |
| 5,356,090 A * | 10/1994 | Sato | 242/289 |
| 5,393,005 A * | 2/1995 | Nakajima | 242/289 |
| 5,692,693 A * | 12/1997 | Yamaguchi | 242/288 |
| 5,865,387 A * | 2/1999 | Hirano | 242/289 |
| 5,996,921 A * | 12/1999 | Hogaki et al. | 242/289 |
| 6,086,005 A * | 7/2000 | Kobayashi et al. | 242/288 |
| 6,126,105 A * | 10/2000 | Yamaguchi | 242/288 |
| 6,196,485 B1 * | 3/2001 | Sato | 242/289 |
| 6,293,483 B1 * | 9/2001 | Sato et al. | 242/289 |
| 6,364,230 B1 * | 4/2002 | Kawasaki | 242/289 |
| 6,371,396 B1 * | 4/2002 | Kawasaki | 242/289 |
| 6,481,657 B1 * | 11/2002 | Oishi et al. | 242/289 |
| 6,908,054 B1 * | 6/2005 | Kim et al. | 242/289 |
| 7,086,621 B1 * | 8/2006 | Matsuzawa et al. | 242/289 |
| 8,534,585 B2 * | 9/2013 | Saito et al. | 242/289 |

FOREIGN PATENT DOCUMENTS

| | | |
|---|---|---|
| KR | 200345064 | 3/2004 |
| KR | 200345065 | 3/2004 |
| KR | 200345066 | 3/2004 |

* cited by examiner

*Primary Examiner* — Emmanuel M Marcelo
(74) *Attorney, Agent, or Firm* — Cantor Colburn LLP

(57) ABSTRACT

A fishing reel having a centrifugal brake system is provided. The fishing reel includes a frame, a shaft, a spool and a centrifugal brake system. The centrifugal brake system includes a support member, a plurality of brake shoes, a brake disc and a controller. The support member is provided on one side of the spool and is rotated in conjunction with the spool. The brake shoes are radially coupled to the support member by respective shaft pins. Each brake shoe has a heavy weight part and a light weight part on opposite sides based on the shaft pin to have a weight eccentric structure. When the spool is rotated, the brake shoes are swung by centrifugal force. The controller adjusts a distance between the brake disc and the brake shoes, thus controlling braking power.

10 Claims, 23 Drawing Sheets

BP - STRONG

BP - WEAK

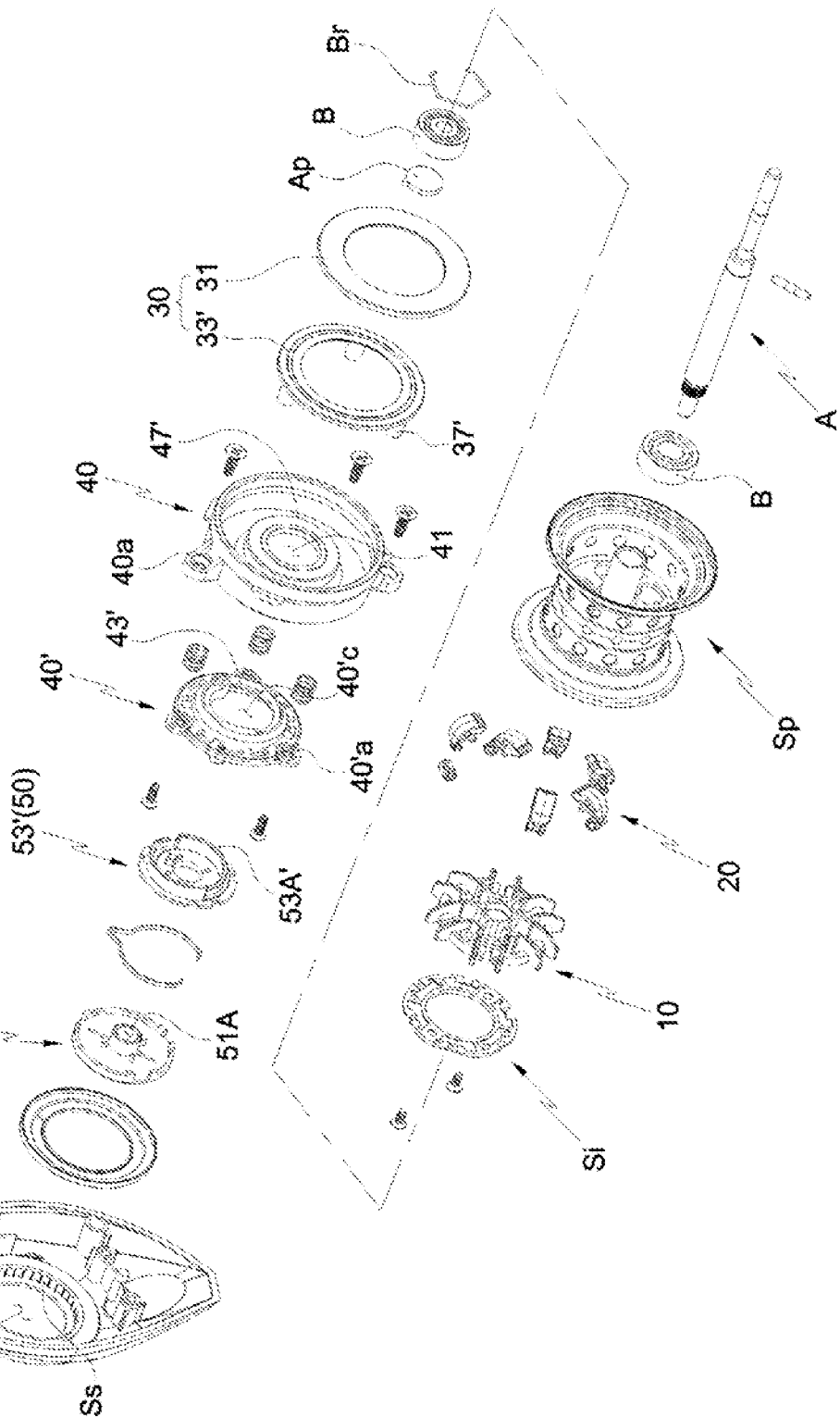

FISHING REEL HAVING CENTRIFUGAL BRAKE SYSTEM

BACKGROUND OF THE INVENTION

1. Field of the Invention

The present invention relates generally to fishing reels having centrifugal brake systems for preventing backlash of spools of the fishing reels and, more particularly, to a fishing reel having a centrifugal brake system which includes a plurality of brake shoes, each of which has a weight eccentric structure having a heavy weight part and a light weight part provided at opposite sides based on a shaft pin around which the brake shoe is swung by centrifugal force, wherein the brake shoes make close contact with a brake pad of a brake disc, thus generating braking power, and the brake disc can be moved so that the braking power can be precisely controlled, and particularly, because the brake disc can be moved forwards or backwards by rotating a dial of the controller which is provided on an outer surface of the fishing reel, precision in adjustment of the braking power is markedly enhanced, and which has advantages of the brake shoe type or magnetic type brake system and remedies their shortcomings.

2. Description of the Related Art

When casting for fishing using a fishing reel or a bait reel, even after a fish hook with bait has been cast, a spool around which a fishing line is wound may still be rotated by centrifugal force, thus causing a backlash event in which the fishing line is overlapped and entangled.

To prevent a backlash problem, first, there is a method using centrifugal force such that a brake shoe makes contact with a brake pad and brakes the spool.

Second, a method using magnetic force to brake the spool may be used.

A representative example of the former was proposed in Korean Utility Model Registration No. 20-0345065 (Mar. 4, 2004), which was filed by the applicant of the present invention, entitled [Device for preventing backlash of spool of bait reel for fishing]. This conventional technique is configured such that the number of brake shoes that can be operated is easily adjusted, whereby the rotation of the spool can be smoothly braked, thus making it possible to control backlash.

A representative example of the latter was proposed in Korean Utility Model Registration No. 20-0345066 (Mar. 4, 2004), which was also filed by the applicant of the present invention, entitled [Spool cover assembly for preventing backlash of spool of bait reel for fishing]. In this technique, a body of a spool cover is an upper end open type, rather than a vertically through body type, so that assembly of elements can be conducted through the open upper end. This technique is also characterized in that the number of permanent magnets can be approximately doubled compared to that of the existing technique.

Typically, as introduced in the former, an anti-backlash brake system using brake shoes is advantageous in that only when the spool is rotated can the braking power be generated, but has a disadvantage of having to open the side cover to control the braking power.

Furthermore, as proposed in the latter, an anti-backlash brake system using magnetic force has an advantage in that the braking power can be controlled by rotating a dial and moving the magnets forwards or backwards without opening the side cover but is disadvantageous in that the braking force always acts.

Given this, a brake system, which can strengthen the advantages and make up for the disadvantages of both methods is required, in other words, is configured such that the braking power can be controlled without opening the side cover, and the On/Off state of the braking power can be selected by a simple manipulation so that conditions in which the braking power is 0 (zero), essential for a noise test or a reel performance test, can be easily embodied.

SUMMARY OF THE INVENTION

Accordingly, the present invention has been made keeping in mind the above problems occurring in the prior art, and an object of the present invention is to provide a fishing reel having a centrifugal brake system which has advantages of both a brake shoe type and a magnetic type so that braking power can be controlled without opening a side cover, and the On/Off state of the braking power can be selectively determined, whereby conditions in which the braking power is 0 (zero), essential for a noise test or a reel performance test, can be easily embodied.

Another object of the present invention is to provide a fishing reel having the centrifugal brake system which includes a plurality of brake shoes, each of which has a weight eccentric structure having a heavy weight part and a light weight part provided at opposite sides based on a shaft pin, and in which the braking force can be easily controlled in such a way that a brake disc is moved by manipulating a controller at the outside of the side cover.

A further object of the present invention is to provide a fishing reel having the centrifugal brake system which further includes stoppers that limit extents of swing displacement of the brake shoes when the spool is rotated, wherein the swing displacement limit points of the stoppers are different from each other, thus making it possible to finely control the centrifugal braking power despite having a simple structure.

Yet another object of the present invention is to provide a fishing reel having the centrifugal brake system in which the brake disc can be moved away from or towards the brake shoes merely by rotating a dial of the controller coupled to the side cover.

Still another object of the present invention is to provide a fishing reel having the centrifugal brake system which further includes a guide means for making movement of the brake disc forwards or backwards to control the braking power smooth.

In order to accomplish the above object, the present invention provides a fishing reel, including: a frame; a shaft coupled to the frame; a spool provided on the shaft to allow a fishing line to be wound around the spool; and a centrifugal brake system, having a support member provided on one side of the spool, the support member being rotated in conjunction with the spool, a plurality of brake shoes radially coupled to the support member by respective shaft pins, each of the brake shoes having a heavy weight part and a light weight part on opposite sides based on the corresponding shaft pin to have a weight eccentric structure, wherein when the spool is rotated, the brake shoes are swung by centrifugal force, a brake disc coupled to the frame, and a controller adjusting a distance between the brake disc and the brake shoes, thus controlling braking power.

The centrifugal brake system may further include a stopper limiting an extent of swing displacement of each brake shoe.

The swing displacement limit points of the stoppers may differ from each other.

The stoppers may be provided in a connection member, and the connection member may be disposed adjacent to the brake disc.

Furthermore, a side cover may be mounted to the frame, and the controller may include a dial coupled to the side cover.

The controller may further include an intermediate member moved when the dial is rotated, thus moving the brake disc forwards or backwards so that the distance between the brake disc and the brake shoes is adjusted.

The intermediate member may include a spiral protrusion on a circumferential outer surface thereof, and the brake disc may include an interlocking arm coming into contact with the spiral protrusion such that the interlocking arm is interlocked with the spiral protrusion.

The brake disc may include a guide means for guiding the brake disc when moved forwards or backwards by the controller.

The brake shoe may further include a locking means for turning off a braking function.

The fishing reel may further include a magnetic type anti-backlash brake system configured in such a way that a permanent magnet is provided on either the support member or the brake disc, and the other is made of a nonmagnetic conductive material.

In addition, radial positions at which the brake shoes are coupled to the support member may be different from each other based on a center axis of the shaft.

A fishing reel having a centrifugal brake system according to the present invention has advantages of both a brake shoe type and a magnetic type so that braking power can be controlled without opening a side cover, and the On/Off state of the braking power can be selectively determined, whereby conditions in which the braking power is 0 (zero), essential for a noise test or a reel performance test, can be easily embodied. Furthermore, the present invention uses a plurality of brake shoes, each of which has a weight eccentric structure having a heavy weight part and a light weight part provided at opposite sides based on a shaft pin. The braking force can be easily controlled in such a way that a brake disc is moved by manipulating a controller at the outside of the side cover. In addition, the present invention further includes stoppers which limit extents of swing displacement of the brake shoes when the spool is rotated. The swing displacement limit points of the stoppers are different from each other, thus making it possible to finely control the centrifugal braking power despite using a simple structure. Moreover, the brake disc can be moved away from or towards the brake shoes merely by rotating a dial of the controller coupled to the side cover. Further, the operation of moving the brake disc forwards or backwards to control the braking power is smoothly conducted by a guide means.

BRIEF DESCRIPTION OF THE DRAWINGS

The above and other objects, features and advantages of the present invention will be more clearly understood from the following detailed description taken in conjunction with the accompanying drawings, in which:

FIGS. 18 and 19 are exploded perspective views showing a critical part of a fishing reel having a modification of the brake shoe according to the present invention.

DESCRIPTION OF THE PREFERRED EMBODIMENTS

Figure 1A:
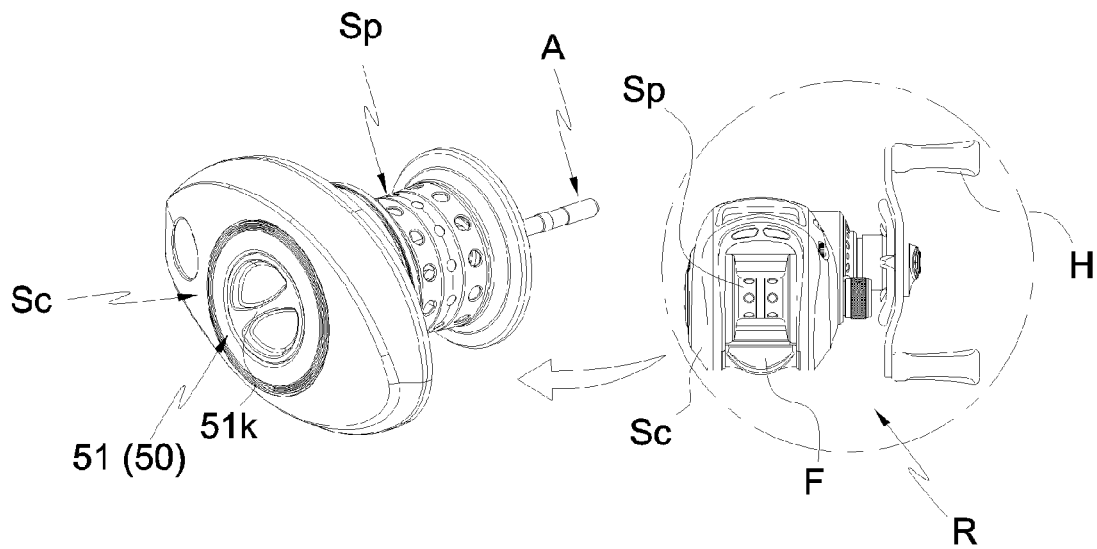
FIGS. 1A and 1B are a perspective view and a sectional view illustrating a fishing reel having a precise centrifugal brake system according to the present invention.

Hereinafter, a preferred embodiment of the present invention will be described in detail with reference to the attached drawings.

This invention may, however, be embodied in many different forms, and should not be construed as limited to the embodiments set forth herein. Rather, all changes that fall within the bounds of the present invention or the equivalence of the bounds are therefore intended to be embraced by the present invention.

The same reference numerals throughout the drawings, that is, the same reference numerals for the second digit or the first digit, or for the second digit, the first digit and a letter of the alphabet, denote elements having the same function. If not specifically mentioned otherwise, the elements denoted by the reference numerals are to be assumed to comply with the above-mentioned reference scheme.

In the drawings, the thicknesses of lines or the sizes of elements may be exaggerated or simplified to more clearly and conveniently illustrate the present invention, but the bounds of the present invention must not be interpreted as being limited thereto.

The terminology used herein is for the purpose of describing particular embodiments only and is not intended to be limiting. As used herein, the singular forms "a," "an" and "the" are intended to include plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1B:
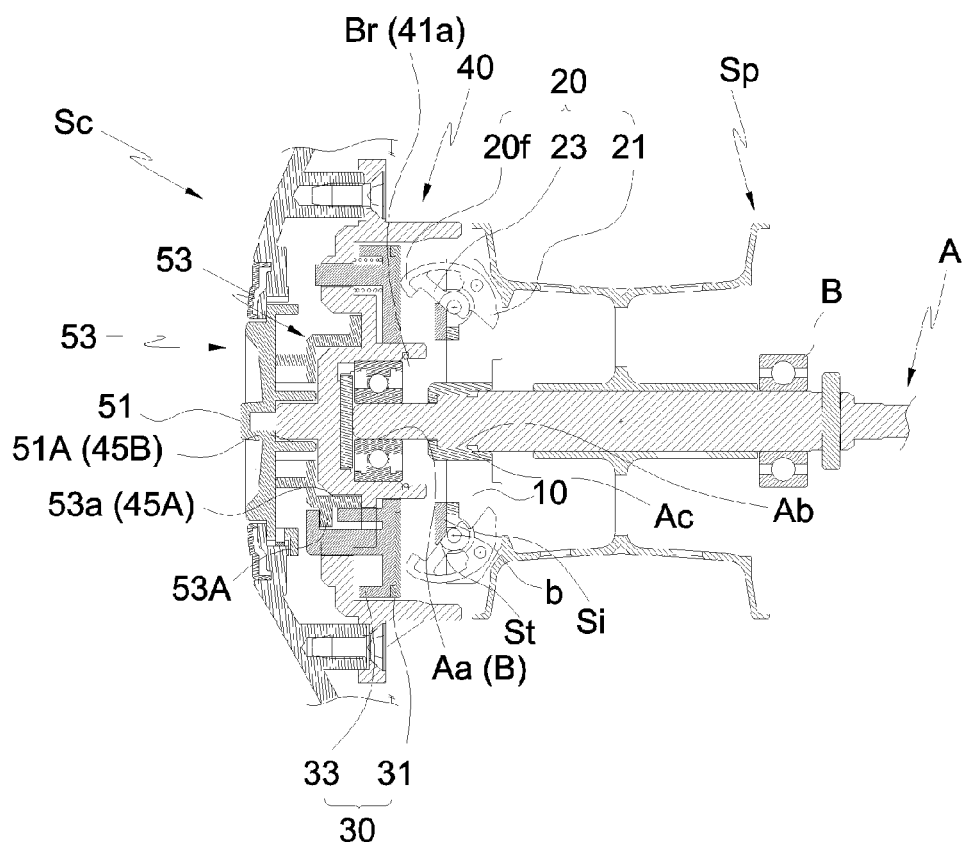
Figure 3:
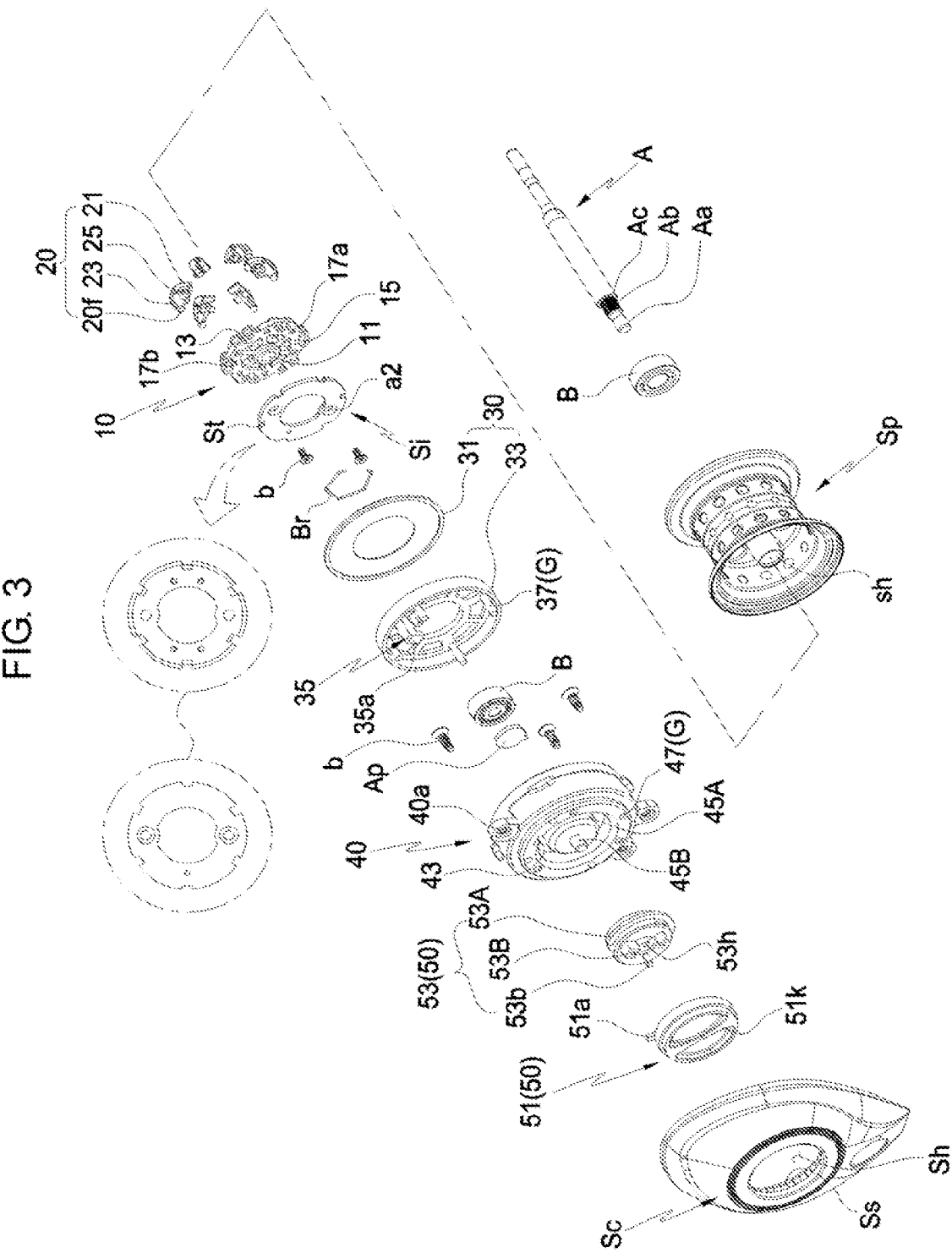
FIGS. 3 and 4 are exploded perspective views of a critical part of the fishing reel having the precise centrifugal brake system when viewed from different directions, according to the present invention.

Before the description of a fishing reel R having a precise centrifugal brake system according to the present invention, the orientation will be approximately defined with reference to FIGS. 1 and 3 for the sake of explanation.

Each drawing of FIGS. 1 and 3 is divided into upper, lower, left, right, front and rear portions, and a side adjacent to a side cover Sc is designated as a first side or outer side. Based on this, the criteria of orientation will be used in the explanation of the embodiment of the present invention that is associated with other drawings and in the accompanying claims.

As shown in the perspective view and the circle designated by the alternate long and short dash line of FIG. 1A, the fishing reel R having the precise centrifugal brake system according to the present invention includes a frame F, a shaft A which is mounted to the frame F, a spool Sp which is provided around the shaft A and around which a fishing line is wound, a handle H which is used to rotate the spool Sp, and a side cover Sc which is coupled to the spool Sp to cover the elements of the fishing reel R.

As shown in FIGS. 1 through 4, the kernel of a first embodiment of the fishing reel R according to the present invention is the centrifugal brake system which includes: brake shoes 20 which are swung when the spool is rotated; a brake disc 30 which makes contact with the brake shoes 20; and a controller 50 which adjusts a distance between the brake disc 30 and the brake shoes 20 to precisely control the braking power.

The spool Sp has a drum shape, having a plurality of through holes in a circumferential outer surface thereof to reduce the weight thereof. Further, a shaft hole sh, into which the shaft A is inserted, is formed in the spool Sp. The shaft A is rotatably supported by two bearings B which are provided on opposite sides of the spool Sp.

The shaft A has, at a predetermined position, a support end Aa which is coupled to a left bearing B. A coupling part Ab and a stepped portion Ac are successively formed on the shaft A from the support end Aa towards the medial portion of the shaft A.

Each of the brake shoes 20 which are radially arranged around the shaft A has a weight eccentric structure in which a heavy weight part 21 and a light weight part 23 are provided on opposite sides of a shaft pin 25. Particularly, the shaft pin 25 is oriented in a circumferential direction of the shaft A, rather than being oriented in a radial direction thereof, such that an axis of the shaft pin 25 does not intersect with that of the shaft A.

Figure 2A:
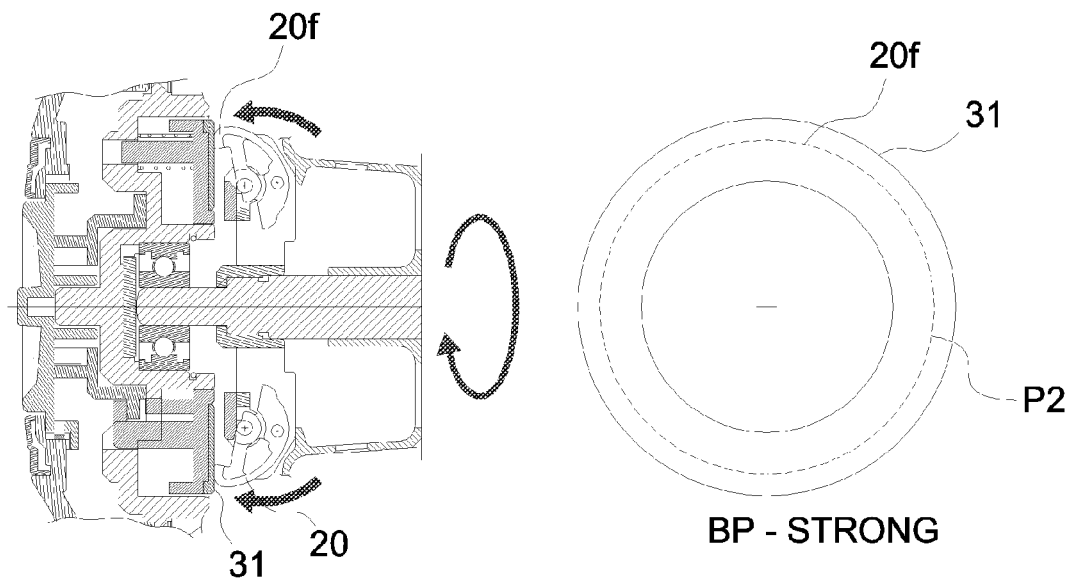
FIGS. 2A through 2C the operation of brake shoes of the fishing reel and variation in braking power of the fishing reel depending on orientation of the brake shoes according to the present invention.
Figure 2B:
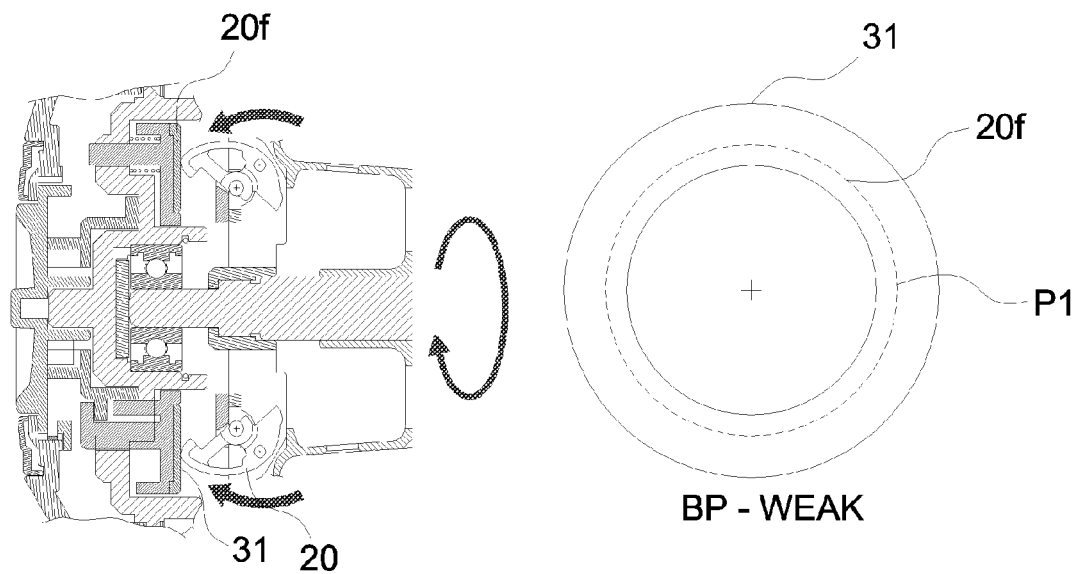
Figure 2C:
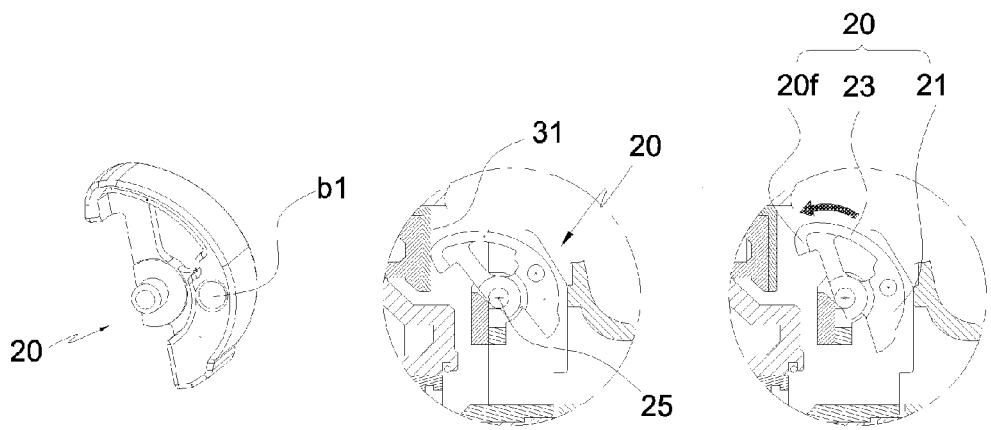

As shown in FIG. 2, when the shaft A is rotated by rotation of the spool Sp, a support member 10, in a circumferential outer portion of which the brake shoes 20 are arranged, is also rotated. Then, each brake shoe 20 is swung around the shaft pin 25 in such a way that the heavy weight part 21 is rotated around the shaft pin 25 away from the shaft A while the light weight part 23 is rotated around the shaft pin 25 towards the shaft A such that the light weight parts 23 of the brake shoes 20 gather towards the shaft A.

The support member 10 is disposed at one side of the spool Sp and is forcibly fitted over the coupling part Ab of the shaft A (in a variety of coupling ways including threaded coupling, bonding, and so on). A position at which the support member 10 is positioned on the shaft A is determined by the stepped portion Ac.

The term 'the coupling of the support member 10 to the shaft A' is a symbolic meaning and a faithful explanation based on the drawings. More essentially, it is a more exact expression of the support member being assembled with the shaft and interlocked to the spool to prevent backlash in such a way that the spool is braked by the centrifugal brake system that is the kernel of the present invention.

The support member 10 has, in a central portion thereof, a through hole 11 which is fitted over the coupling part Ab of the shaft A. Furthermore, the support member 10 has shaft-pin-installation parts, to which the shaft pins 25 of the respective brake shoes 20 of the weight-eccentric structure are coupled so that the brake shoes 20 can be swung using centrifugal force. Particularly, each shaft-pin-installation part has a shaft pin depression 15. The support member has openings 13 which radially communicate with the respective shaft pin depressions 15 to provide space in which the brake shoes 20 can swing using centrifugal force around the shaft pins 25.

Preferably, each brake shoe 20 has a stopper to define a limit of the swing displacement.

When forward or backward movement of the brake disc 30 is controlled by the controller 50, the maximum of the distance between the brake disc 30 and each brake shoe 20 is defined by the stopper. When the distance between the brake disc 30 and each brake shoe 20 is greatest, the braking power becomes zero.

When the brake shoes 20 are swung to the maximum by the centrifugal force, in other words, when each brake shoe is swung by the rotation of the spool in such a way that the heavy weight part 21 of the brake shoe 20 is rotated away from the shaft A and the light weight part 23 is rotated towards the shaft A, a friction part 20f provided on an end of the light weight part 23 becomes parallel to the shaft A.

In this state, if the friction part 20f of the brake shoe 20 does not come into contact with the brake pad 31 of the brake disc 30, the braking power becomes zero. However, this structure may not be preferable, because it is against the trend to reduce the weight and size of the fishing reel R, given the fact that the fishing reel R has a compact assembly structure in which elements having various functions are integrated in a smaller space than an adult's fist.

In the embodiment illustrated in the drawings, the brake disc 30 is coupled to a mounting drum 40, and the mounting drum 40 is fastened to the side cover Sc.

In the specification (particularly, in the claims), the description that the brake disc is coupled to the frame is to comprehensively express critical common factors of embodiments and modifications based on the scope and spirit of the invention, in consideration of the fact that the mounting drum, the side cover and other elements are eventually mounted to the frame.

The function of the stopper may be embodied by the shape of the opening 13 of the support member 10.

However, the function of the support member which supports the shaft pin 25 of each brake shoe 20 and the function of the stopper may be separately provided.

The production process can be facilitated, and the product quality, such as durability, as well as the price competitiveness, can be enhanced by assigning required functions to different elements.

Moreover, the stoppers have different swing displacement limit points to precisely control braking power and are configured such that a variety of swing displacement combinations of the brake shoes depending on fishing conditions can be provided. To achieve the above purposes, in the present invention, a separate member, that is, a connection member Si which integrally has stoppers for the brake shoes 20, is used to conduct the function of stopping the brake shoes.

Figure 7:
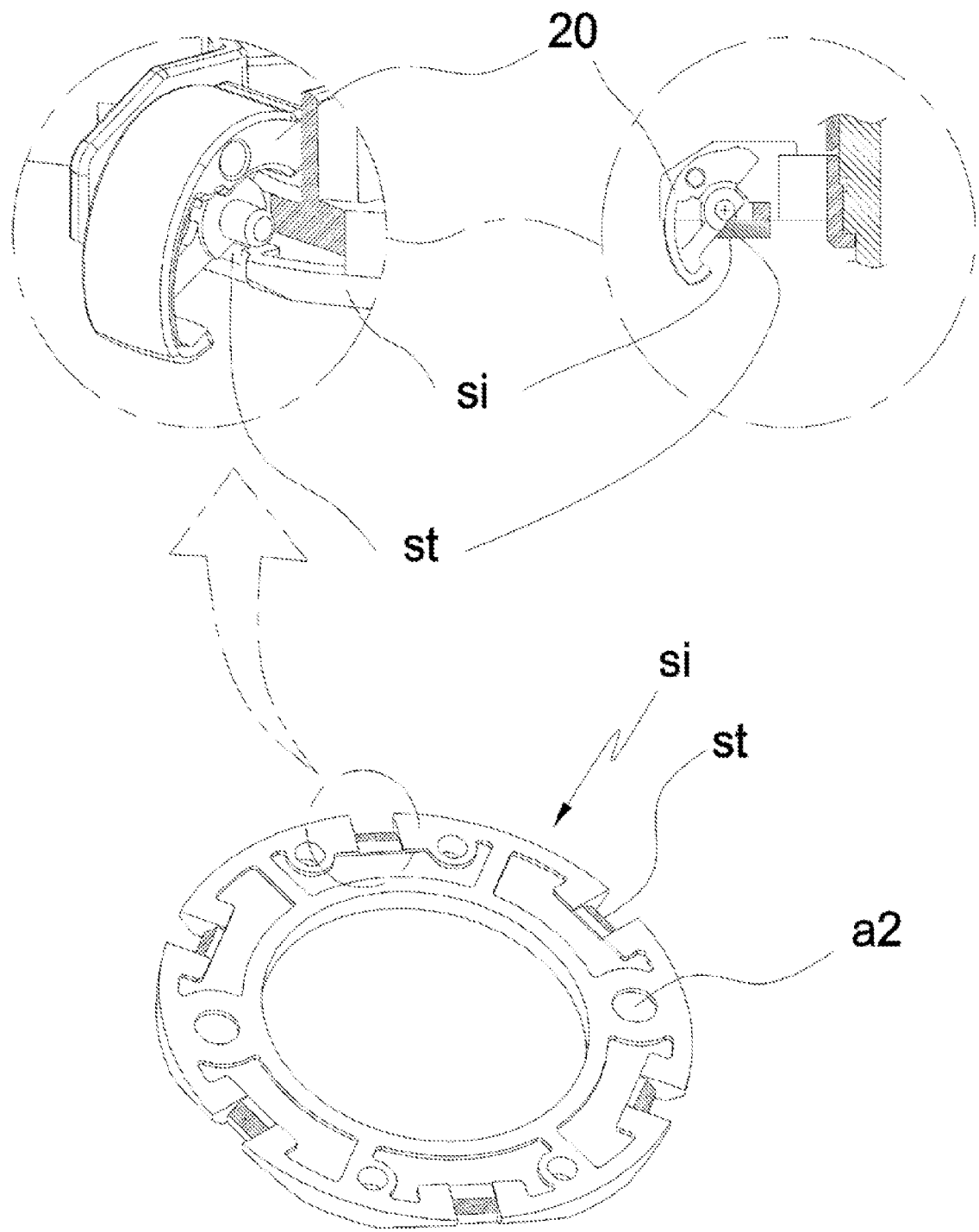
FIG. 7 illustrates displacement in swing motion of the brake shoe according to the present invention.

As shown in left and right side views in the two circles designated by the alternate long and short dash line of FIG. 3 and as shown in FIG. 7 illustrating the connection member Si, slot-type stoppers St are formed in the connection member Si. The slots of each pair of stoppers St which are formed at diametrically opposite positions for balanced friction contact (as necessary, it may be configured such that unbalanced friction contact is possible) have the same depth, but are different in depth from the slots of other pairs of stoppers.

That is, when the spool rotates, the support member 10 is rotated in conjunction with the rotation of the spool, and each of the six brake shoes 20 is swung around the shaft pin 25 by centrifugal force. Then, the light weight part 21 is rotated towards the shaft A. The extent to which the brake shoe 20 is swung is determined by making contact with the stopper St.

If the depth of the slot forming the stopper is comparatively small, the stopper comes into contact with the light weight part of the brake shoe 20 early, whereby the brake shoe 20 is stopped, and it can no longer conduct the braking function.

If the depth of the slot of the stopper is comparatively large, the light weight part of the brake shoe comes into contact with the stopper late, so that it can conduct the braking function.

Figure 5:
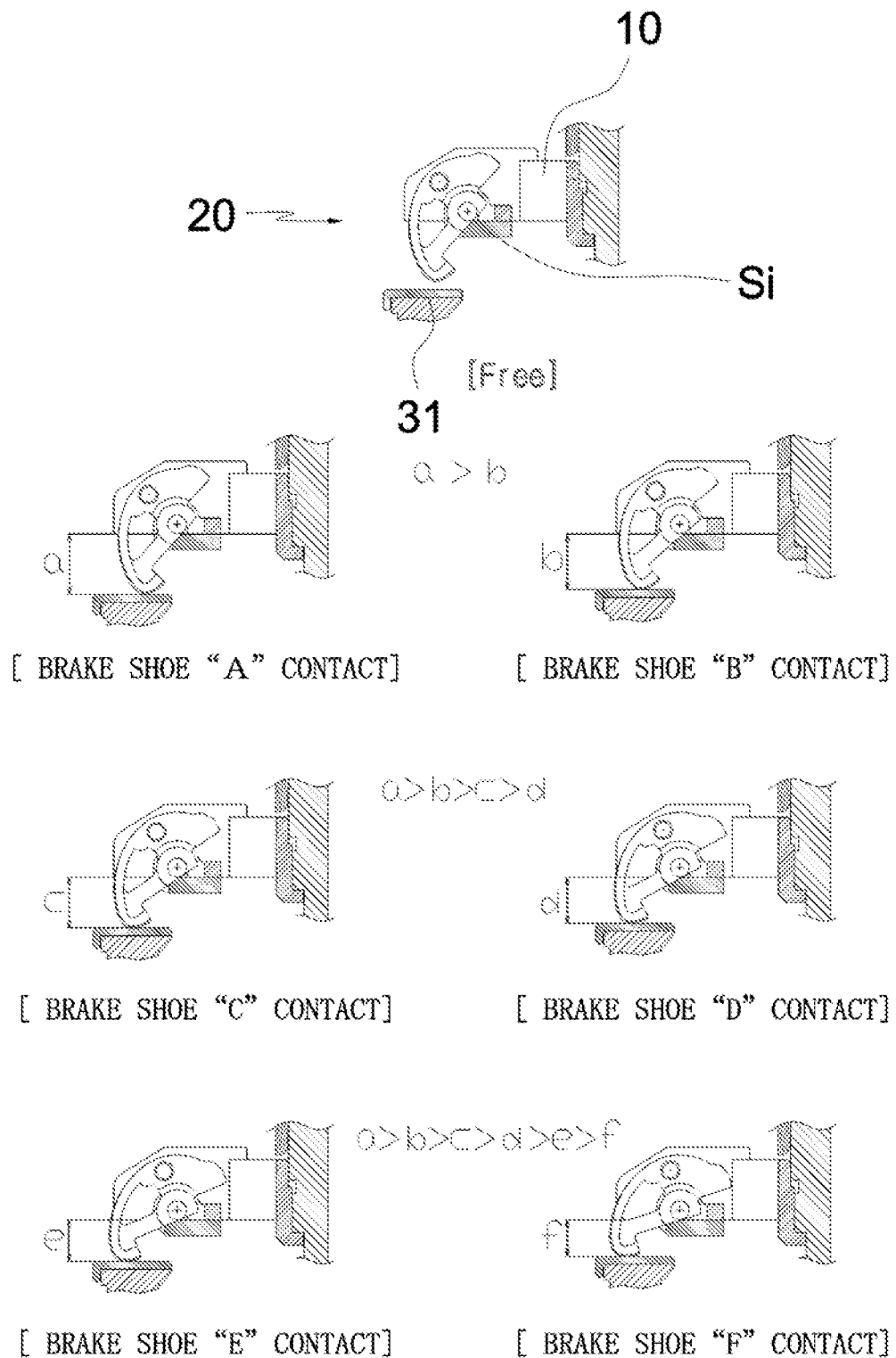
FIG. 5 illustrates the operation of the brake shoe according to a height of the brake shoe.

Therefore, as shown in FIGS. 2 and 5, when the distance between the brake disc 30 and the brake shoes 20 or the support member 10 is reduced by the controller (50; refer to FIG. 3), the friction parts 20f of all of the brake shoes 20 are brought into contact with the brake pad 31.

When the distance between the brake disc 30 and the brake shoes 20 or the support member 10 is relatively large, the friction parts 20f of some pairs of the brake shoes 20 are brought into contact with the brake pad 31 (in the case of the brake shoes which are disposed in the deep slots of the stoppers), but the friction parts 20f of the other pairs of brake shoes 20 do not come into contact with the brake pad 31 (in the case of the brake shoes that are disposed in the shallow slots of the stoppers).

The present invention is designed such that, when the distance between the brake disc 30 and the brake shoes or the support member 10 is largest, the friction parts 20f of all of the brake shoes 20 do not come into contact with the brake pad (even when the friction parts 20f are not parallel to the shaft), whereby the braking power of the centrifugal brake system can become zero.

Thereby, even in a noise test or a reel performance test which must be carried out when the braking power is 0 (zero), the Off state of the braking power can be made merely by manipulating the controller 50 without removing the side cover.

Furthermore, in the case where the distance between the brake disc 30 and the brake shoes or the support member 10 is smallest, even when the spool does not rotate, the friction parts 20f of the brake shoes 20 come into contact with the brake pad 31 so that the function of braking the rotation of the spool can be continuously conducted.

As such, the structure in which the swing displacement limit points of the stoppers differ from each other makes the production, control and design easier and is more effective in terms of precisely controlling the braking power, compared to the structure in which the brake shoes have different shapes of heavy weight parts and light weight parts.

As necessary, the heavy weight part and the light weight part of each brake shoe may be made of different materials, and the friction part 20f may be made of a material (superior in terms of wear resistance, rub resistance or both, for example, hard rubber or hard synthetic resin) different from that of other portions.

Hereinafter, several modifications of the brake shoe will be described with reference to FIGS. 12A through 12E.

Figure 12A:
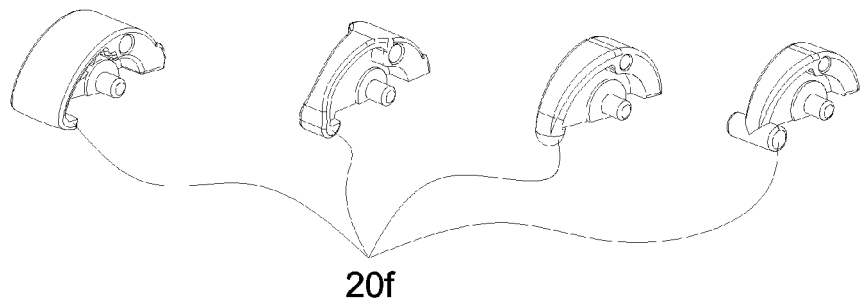
FIGS. 12A through 12E are perspective views showing several modifications of the brake shoe according to the present invention.

As shown in FIG. 12A, the brake shoe 20 may have a single integrated body. The body of the brake shoe 20 can be modified into a variety of shapes, including a basic type in which the heavy weight part, the light weight part and the friction part have the same width, a cut type in which a portion other than the heavy weight part is cut to form the light weight part, and a wedge type in which the width is gradually reduced from the heavy weight part to the friction part.

Figure 12B:
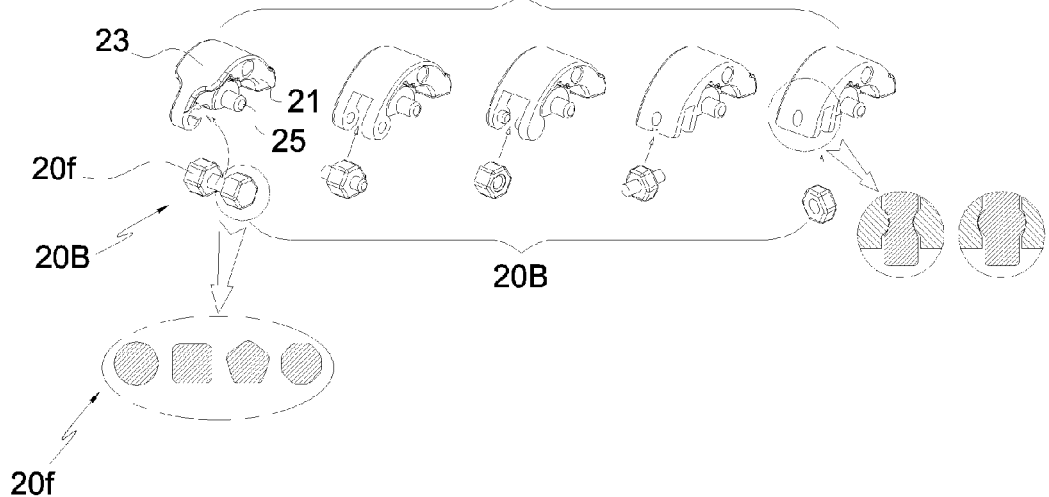

As shown in FIG. 12B, the brake shoe 20 may have a two-piece structure including a main body 20A and a separate friction part body 20B. The main body 20A has a shaft installation portion on an end of the light weight part 23.

The separate friction part body 20B has a shaft pin which is rotatably coupled to the shaft installation portion.

In more detail, the shaft installation portion has a C shape, and the separate friction part body 20B includes the shaft pin which is rotatably coupled to the C-shaped shaft installation portion, and friction parts which are respectively provided on opposite ends of the shaft pin.

Alternatively, the brake shoe 20 may be configured such that an inward-depressed shaft installation portion is formed in an end of the light weight part 23, and the separate friction part body 20B has a shaft pin corresponding to the inward-depressed shaft installation portion. A structure that is opposite to this is also possible.

As a further alternative, the brake shoe 20 may configured such that a 'U'-shaped shaft installation portion and a coupling depression are formed in an end of the light weight part 23, and the separate friction part body 20B has a shaft pin which is longitudinally coupled to the 'U'-shaped shaft installation portion.

Furthermore, the 'U'-shaped shaft installation portion may be modified into a hole type shaft installation portion which is not open on a lower end thereof.

Figure 12C:
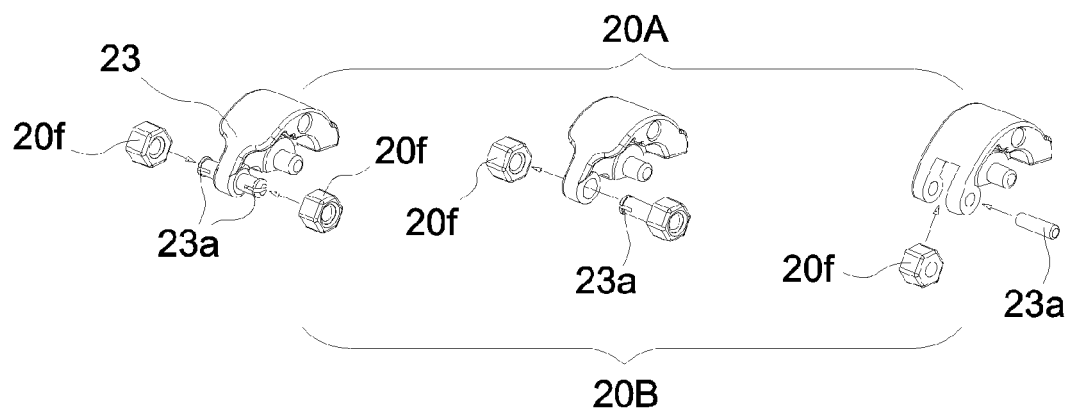

As shown in FIG. 12C, the brake shoe 20 of the present invention may have a three-piece structure. In this case, the brake shoe 20 may be configured such that a shaft pin is integrally formed on an end of a light weight part 23 of a main body 20A, and two friction part bodies 20B are coupled to the shaft pin.

Alternatively, the brake shoe 20 may be configured such that a through hole is formed in an end of a light weight part 23 of a main body 20A, and a separate friction part body 20B includes a first friction part provided with a shaft pin and a second friction part which is coupled to the first friction part through the through hole.

As a further alternative, the brake shoe 20 may be configured such that a shaft installation portion is formed in an end of a light weight part 23 of a main body 20A, and a separate friction part body 20B and a separate shaft pin 23a are coupled to the shaft installation portion.

Figure 12D:
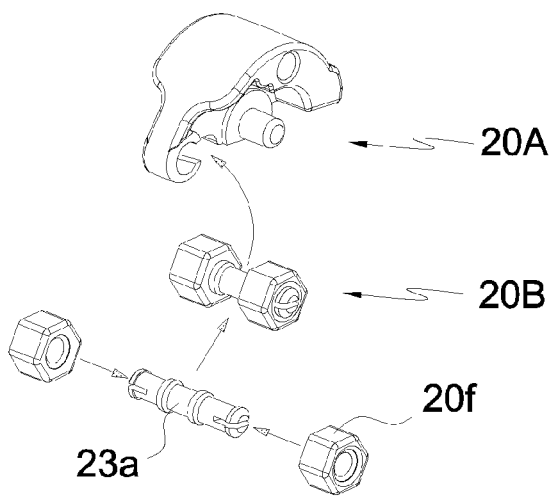

Furthermore, as shown in FIG. 12D, the brake shoe 20 of the present invention may have a four-piece structure. In this case, the brake shoe 20 is configured such that a C-shaped shaft installation portion is formed in an end of a light weight part 23, and a separate friction part body 20B includes two friction parts 20f and a shaft pin 23a, which are coupled to each other, and is coupled to the C-shaped shaft installation portion.

As such, the brake shoe according to the present invention can be embodied in a variety of shapes which can facilitate a manufacturing process and enhance price competitiveness.

Furthermore, among the different types of brake shoes, in the case of a brake shoe having a separate friction part body 20B provided so as to be rotatable, there is an effect of further increasing the braking power.

That is, when the brake shoe 20 is rotated in one direction by rotation of the spool Sp, the separate friction part body 20B having the friction part 20f can rotate with respect to the brake pad 31 in a different direction from that of the rotation of the brake shoe 20, in other words, in a direction perpendicular to the direction in which the brake shoe 20 is rotated.

As such, because the separate friction part body 20B can be rotated by contact friction between the friction part 20f and the brake pad 31 in a different direction from that of the rotation of the brake shoe 20, the braking power generated by contact of the brake shoe 20 is increased, thus markedly enhancing the performance as the brake system.

Preferably, the friction part 20f of the separate friction part body 20B has a smooth-angled polyhedral structure.

If the rotating force of the spool Sp conflicts with the swinging force of the light weight part 23 resulting from the centrifugal force accompanying the rotating force, and particularly, when the rotating force reaches the maximum and exceeds the swinging force generated by the centrifugal force, the light weight part 23 is finely swung in a direction opposite to the direction of the centrifugal force by repulsive force at the moment it makes contact with the brake pad 31.

At this time, the light weight part 23 is swung again by the centrifugal force and is brought into contact with the brake pad 31.

While such contact is repeated, contact between the light weight part 23 and the brake pad 31 provides the effect similar to an ABS (anti-lock brake system) which is used in a brake system for vehicles or the like.

Compared to braking using continuous contact (friction), braking using intermittently repeated contact can prevent a phenomenon of a reduction in frictional force attributable to heat increased by friction. Therefore, the function and effect of the present invention as the brake system for preventing a backlash phenomenon can be further enhanced.

As described above, the brake system of the present invention is provided to prevent a backlash phenomenon when casting. The essential purpose of the present invention is to prevent a casting distance from being reduced by the backlash phenomenon or prevent a fishing line from being entangled by the backlash phenomenon, causing a casting failure.

If the braking power exceeds the required braking power, a problem of a reduction in the casting distance may be caused by reduced rotating force of the spool Sp.

However, in the present invention, the distances between the brake shoes 20 and the brake pad 31 are set to be different from each other so that the braking power can be precisely adjusted.

Therefore, the problem of a reduction in the casting distance that results from an increase of the braking power can be minimized using the controller 50.

In addition, the braking function of each brake shoe 20 can be selectively turned off by a corresponding locking means.

Hence, the problem of a reduction in the casting distance can be further mitigated. In a second embodiment in which the brake shoe 20 has increased braking power, a range of variation of the braking power is increased so that a user can selectively determine the extent of the braking power and more easily and variously determine the casting distance.

Figure 12E:
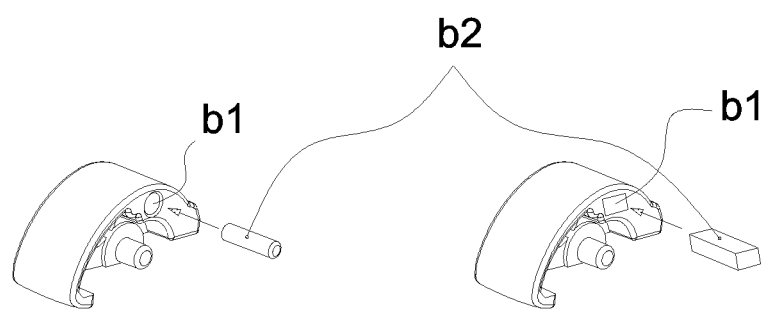

As shown in FIG. 12E illustrating a modification of the brake shoe, the brake shoe may have a hole or depression b1 which is formed in either the heavy weight part or the light weight part or each of both of them. A balance weight b2 which can have various sizes and shapes and be made of various materials is provided in the hole or depression b1.

Furthermore, in a modification embodiment, as necessary, the position of the center of gravity of the brake shoe, and the weight of either the heavy weight or the light weight part or both of them are different for each brake shoe.

Figure 16A:
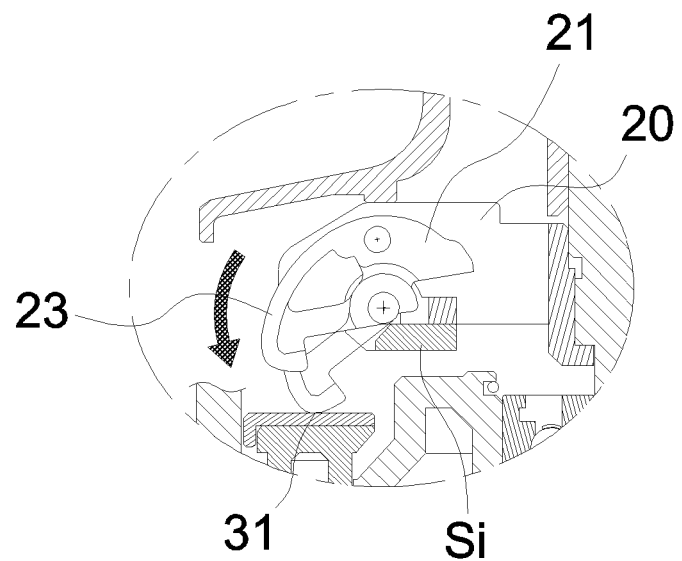
FIGS. 16A through 16C views illustrating modifications of the brake shoe and a returning means according to the present invention.
Figure 16B:
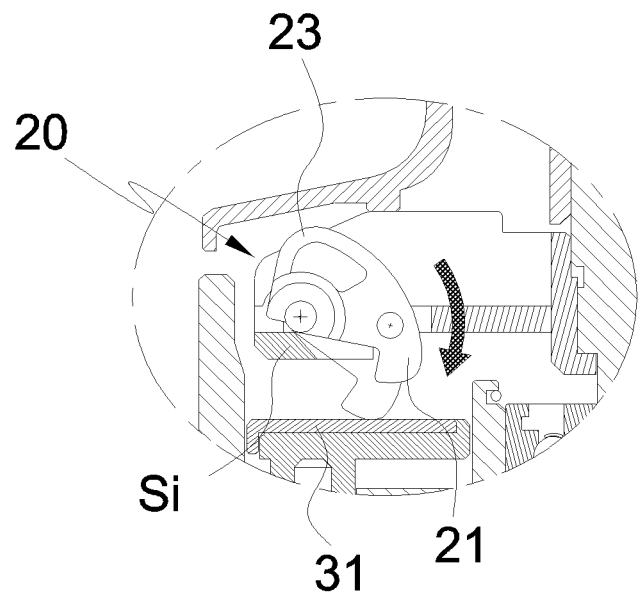

That is, as shown in FIGS. 16A and 16B, the brake shoe according to the present invention may be configured such that the positions of the heavy weight part and the light weight part are opposite to that of the above-stated embodiment, and a friction part is formed on an end of the heavy weight part, whereby the braking power can be varied by the weight of the heavy weight part, and the braking power can be adjusted by changing a position at which the friction part makes contact with the brake disc.

Figure 15:
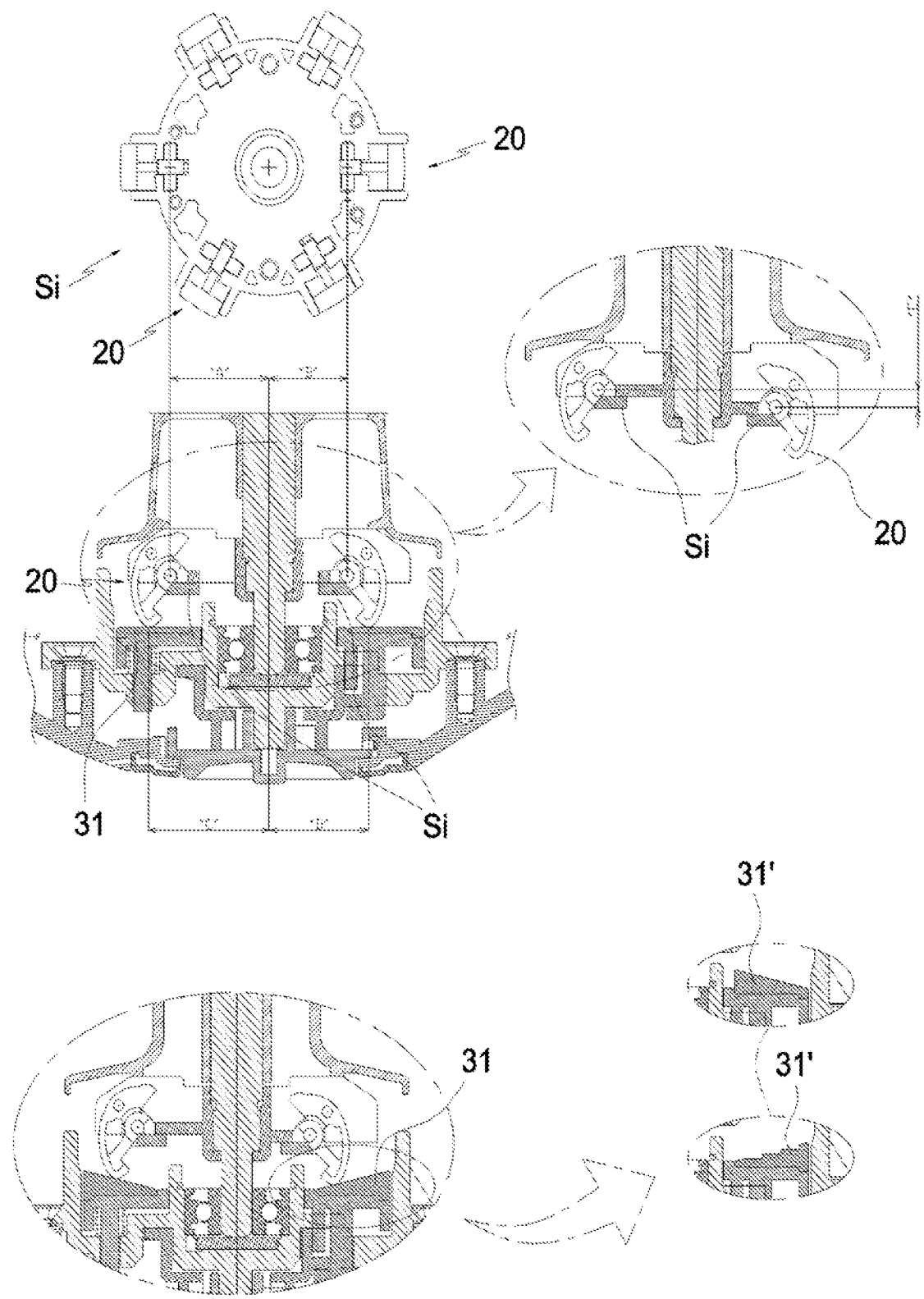
FIG. 15 illustrates the operation of the fishing reel according to the position of the brake shoe and a modification of a brake pad.

Moreover, as shown in FIG. 15, the present invention may be configured such that radial positions of the brake shoes coupled to the support member are different from each other based on the center axis of the shaft so that action points, at which the friction parts of the brake shoes come into contact with the brake pad of the brake disc and generate braking powers, are different from each other.

In this case, the different radial positions at which the respective brake shoes are coupled to the support member may be fixed.

Alternatively, each of the shaft pin depressions of the support member to which the shaft pin of the corresponding brake shoe is coupled may have a multi-stepped structure so that the radial coupling position can be adjusted when necessary.

As a further alternative, the shaft pin of each brake shoe may be configured such that it slides to allow the brake shoe to be adjusted in position and is fixed at the adjusted position by various methods (bonding, force-fitting, and so on).

Furthermore, as shown in a sectional view disposed at the right portion of FIG. 15, coupling portions between the support member 10 and the brake shoes 20 are formed at different heights. In this case, the stoppers St and the brake shoes 20 are combined at different heights by rotating the support member 10 and the connection member Si, whereby the braking power can be adjusted.

As shown in a sectional view and a critical-part enlarged sectional view at the lower portion of FIG. 15, the brake pad 31 may be modified into an inclined or stepped brake pad 31' which is increased in height from the central portion to the outer portion. In this case, the braking power can be finely adjusted by the above-mentioned braking power adjustment methods.

For instance, a skilled user can finely adjust the braking power in consideration of several factors such as a target point, target fish species, environment, etc. Moreover, in the case of an unskilled user, it is preferable that he/she tries to finely adjust the braking power to improve his/her fishing skill. Therefore, the present invention can provide the fishing reel having the precise centrifugal brake system which can be set appropriate to the style and skill level of each of all users, thus being very useful.

Meanwhile, the fishing reel of the present invention is configured such that not only the swing displacement can be adjusted by the stopper St but also a limit unit interlocked to the brake shoe 20 may be provided to allow the user to adjust the braking power.

Figure 17A:
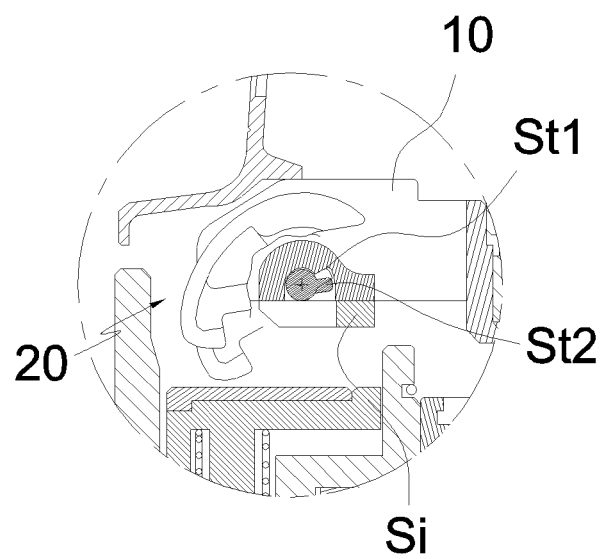
FIGS. 17A through 17C are views illustrating a limit unit of the brake shoe according to the present invention.
Figure 17B:
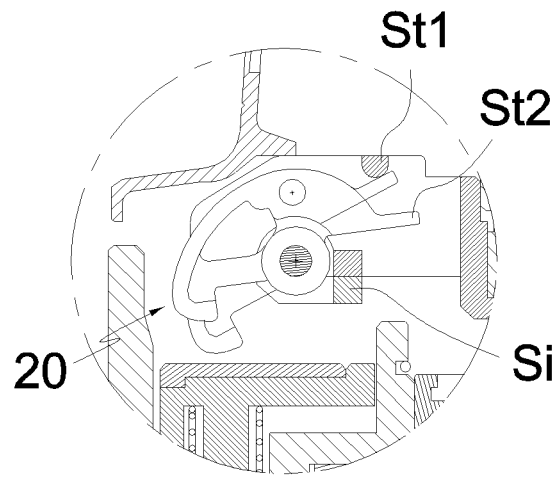
Figure 17C:
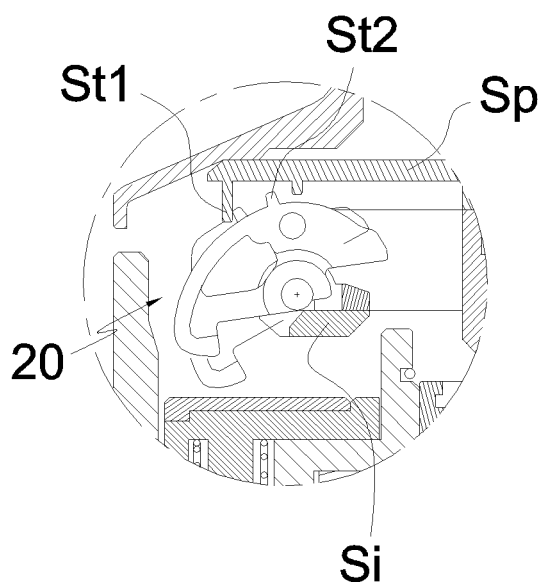

For this, as shown in FIGS. 17A through 17C, the limit unit includes a locking protrusion St2 which is provided on a screw that couples the brake shoe 20 to the support member 10, and a stepped portion St1 which is provided in a shaft installation portion to which the brake shoe is hinged.

It is preferable that the swing displacements of the brake shoes 20 differ from each other to enable the user to selectively adjust the braking power.

Alternatively, as shown in FIG. 17B, the limit unit may include a locking protrusion St which is provided on an end of the heavy weight part of the brake shoe, and a stepped portion St1 which is provided on the spool.

As a further alternative, as shown in FIG. 17C, the limit unit may include a stepped portion St1 which protrudes downwards from an outer edge of a plate part of the spool Sp, and a locking protrusion St2 which is provided on either the heavy weight part or the light weight part of the brake shoe 20 or each of both.

The fishing reel according to the present invention further includes a returning means which is provided in the brake shoe 20 to prevent the brake shoe 20 from making excessive contact with the brake pad 31.

In detail, each brake shoe 20 has the returning means by which it can return to the original position, whereby when the rotational speed of the spool increases and the centrifugal force thus increases, the brake shoe 20 conducts the braking function, and when the centrifugal force is reduced by the braking, the brake shoe 20 returns to its original position and releases the brake pad which has been braked by the brake shoe 20. Thereby, the rotational speed of the spool can be maintained constant.

Figure 16C:
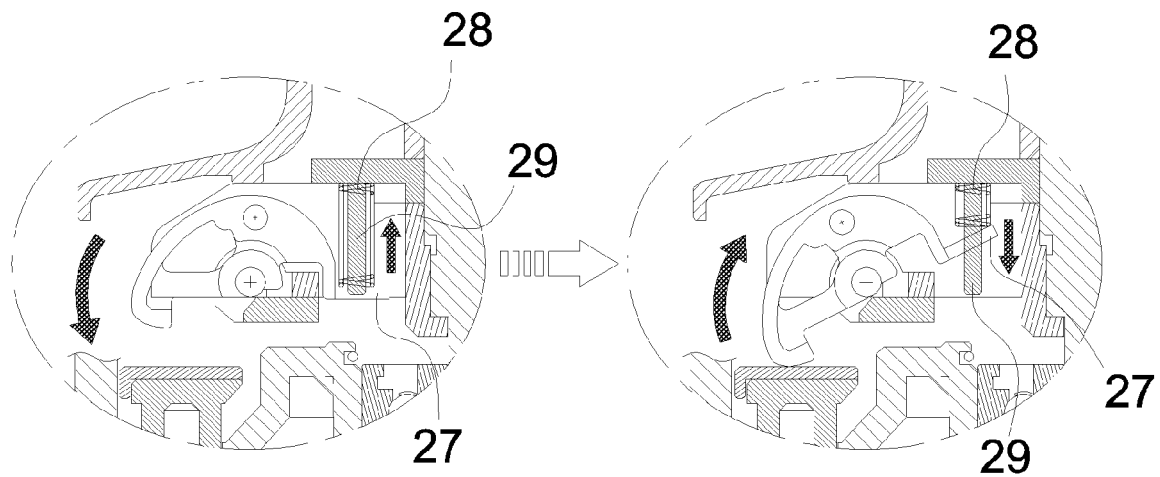

To achieve the above purpose, as shown in FIG. 16C, the returning means of the brake shoe 20 includes a support part 27 which is provided on a noncontact part (in the drawing, an end of the heavy weight part) of the brake shoe 20 and has a through hole (not shown), a support rod 29 which protrudes from the plate part of the spool and is inserted into the through hole of the support part 27, and a coil spring 28 which is interposed between the support part 27 and the support rod 29.

By virtue of the elastic force of the coil spring 28, rather than the brake shoe performing the braking function in ordinary times, only when the centrifugal force generated by rotation of the spool exceeds a predetermined extent can the brake shoe 20 be swung, to conduct the braking function, in a direction opposite to the direction in which the coil spring applies the elastic force to the brake shoe 20.

Such returning and frictional-braking are alternated with each other by the elastic force of the coil spring and the centrifugal force generated by the rotation of the spool (in other words, the generation of friction between the brake shoe and the brake pad is discontinuous). Therefore, the present invention can not only prevent a backlash phenomenon, but can also prevent excessive braking power from reducing the casting distance.

The support member 10 and the connection member Si provided with the stoppers St are coupled to each other by bolts b which are threaded into respective coupling holes 17b of the support member 10 and corresponding coupling holes a2 of the connection member Si.

Coupling protrusions a1 are provided on a right side surface of the connection member Si, and coupling holes 17a to which the corresponding coupling protrusions are coupled are formed in the support member 10 to facilitate the assembly and reinforce the coupling force or the support force.

The connection member Si also functions as a cover to prevent the brake shoes 20 disposed in the shaft pin depressions 15 of the support member 10 from being undesirably removed therefrom.

The support member 10 may be configured such that it can partially rotate with respect to the connection member Si to enable the connection member si to function as a locking device to turn on/off the operation of the brake shoes.

Figure 13A:
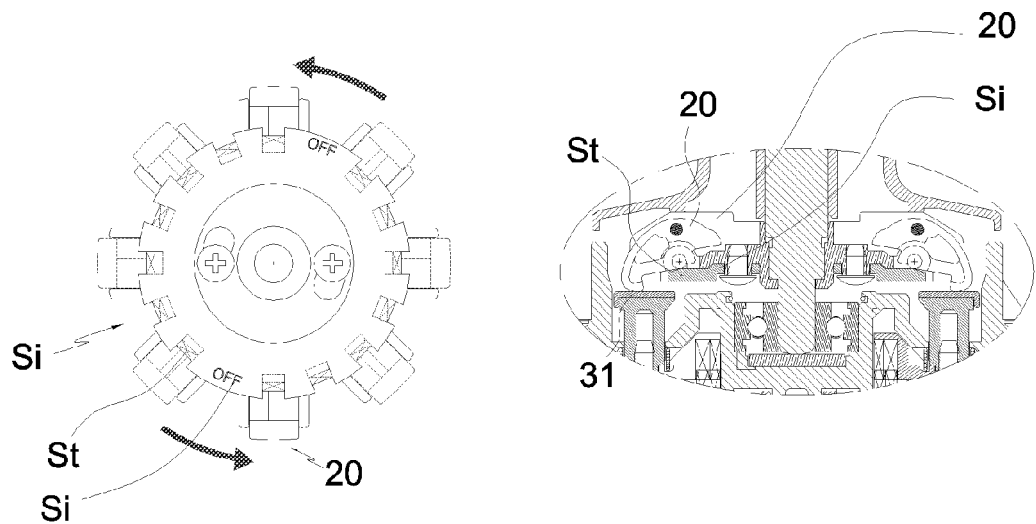
FIG. 13A, 13B, and FIG. 14 are views illustrating on/off operation of the brake shoe according to the present invention.
Figure 13B:
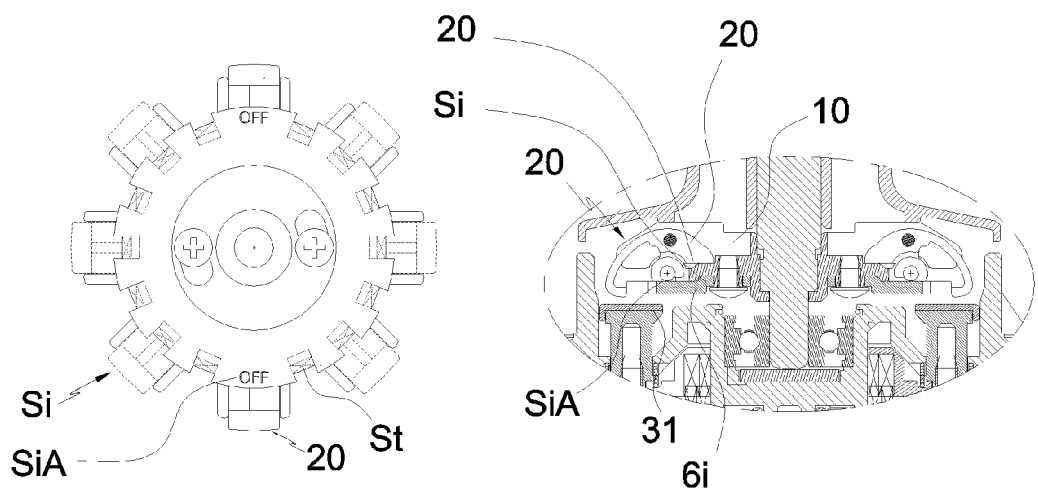
Figure 14:
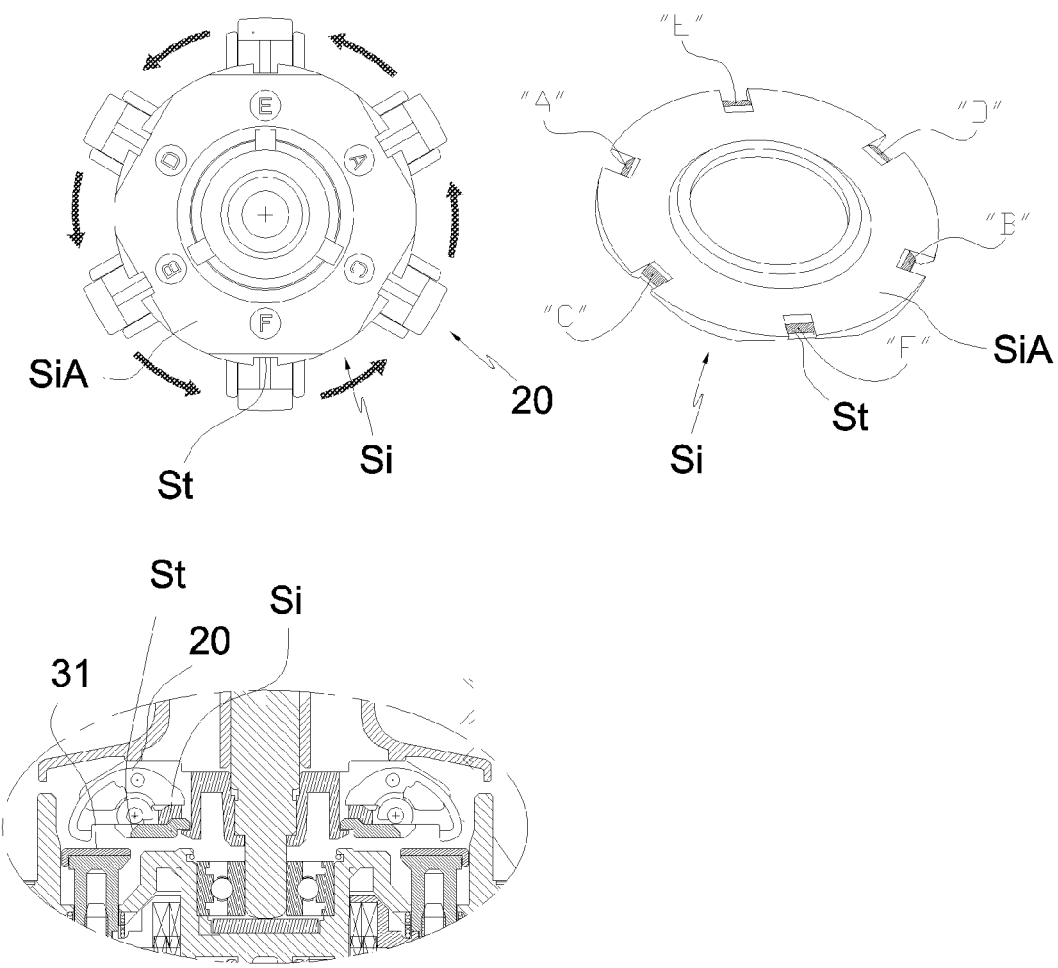

As shown in FIGS. 13A, 13B, and 14, the stoppers St each of which has a depressed shape are formed in the connection member Si and arranged in the circumferential direction. Thereby, planar portions SiA are formed between the stoppers St. Thanks to this structure, the connection member Si can function as the locking device in such a way that the planar portions SiA fix the brake shoes 20 such that the brake shoes 20 cannot be swung, whereby the noncontact state between the friction parts of the brake shoes 20 and the brake pad 31 can be maintained.

That is, when the support member 10 is in the On state, the brake shoes are disposed corresponding to the stoppers St of the support member 10, so that the brake shoes can be swung into the corresponding stoppers St by centrifugal force and be brought into contact with the brake pad 31 to generate braking power.

The support member 10 enters the Off state by rotating the support member 10 in one direction such that the brake shoes are disposed at positions corresponding to the planar portions SiA of the connection member Si. When the support member 10 is in the Off state, the brake shoes 20 cannot be swung towards the brake pad 31 by the planar portions SiA.

The brake disc 30 includes an auxiliary disc 33 (aiming to reduce the weight of the brake disc and facilitate a process of forming the brake disc) which is connected to other elements, and the brake pad 31 (having abrasion resistance) which is brought into contact with the friction parts 20f of the brake shoes. As such, the brake disc 30 comprises two parts having different functions which are embodied by making them using materials having different properties, whereby the price competitiveness, the quality and the productivity can be enhanced.

The brake pad and the auxiliary disc can be coupled to each other by various methods, for example, force fitting, bonding, bolting, welding, etc.

Furthermore, an interlocking arm 35, which has a locking protrusion 35a on an end thereof, and a guide pin 37, which forms a part of a guide means G, are provided on a left side surface of the auxiliary disc 33.

Figure 4:
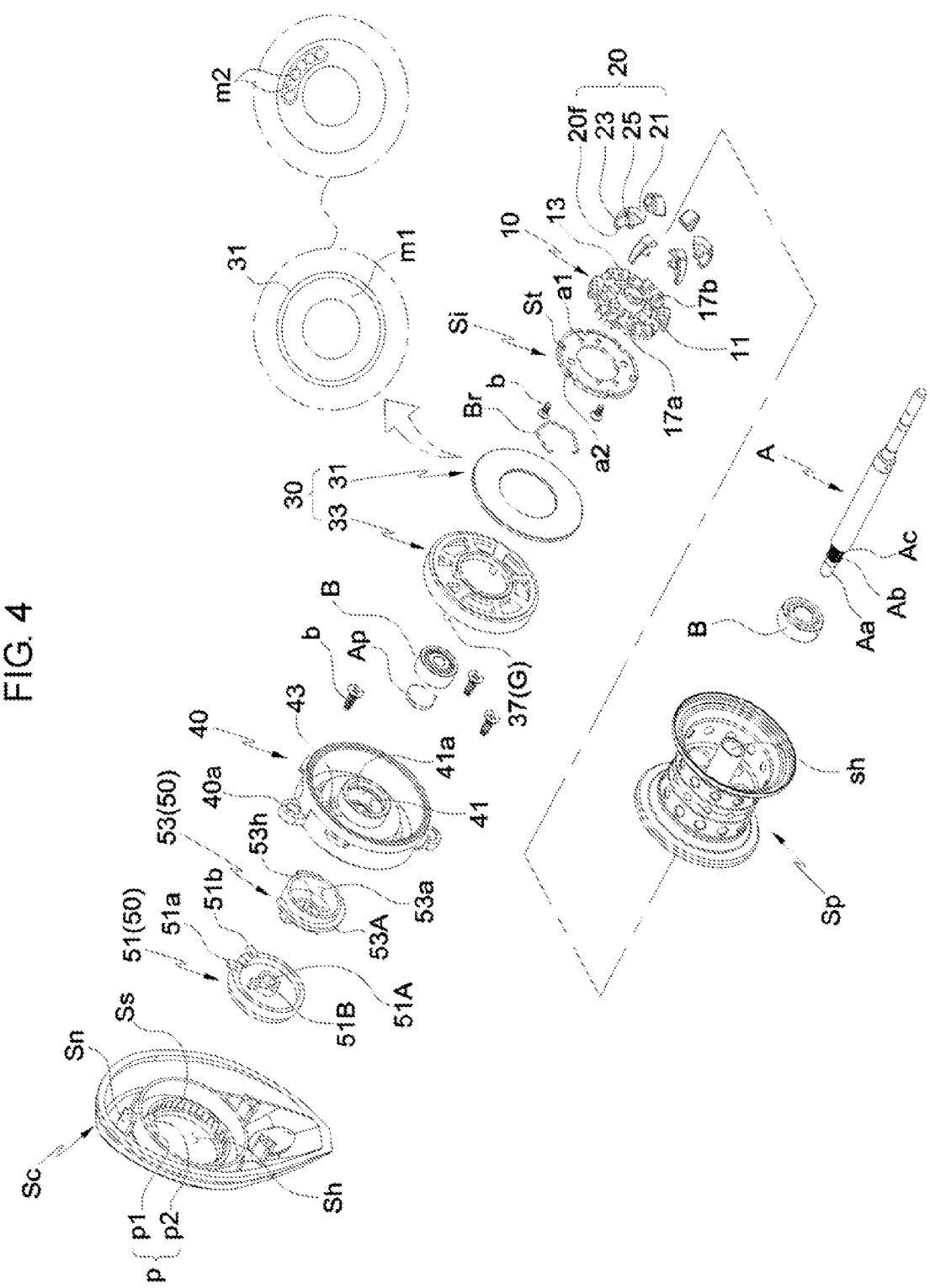

Meanwhile, as shown in the circle designated by the alternate long and short dash line at a left side of the upper portion of FIG. 4, the brake disc, particularly, the brake pad 31, may be made of a permanent magnet m1 to embody a hybrid type brake system including an anti-backlash braking structure using magnetic force.

Figure 6:
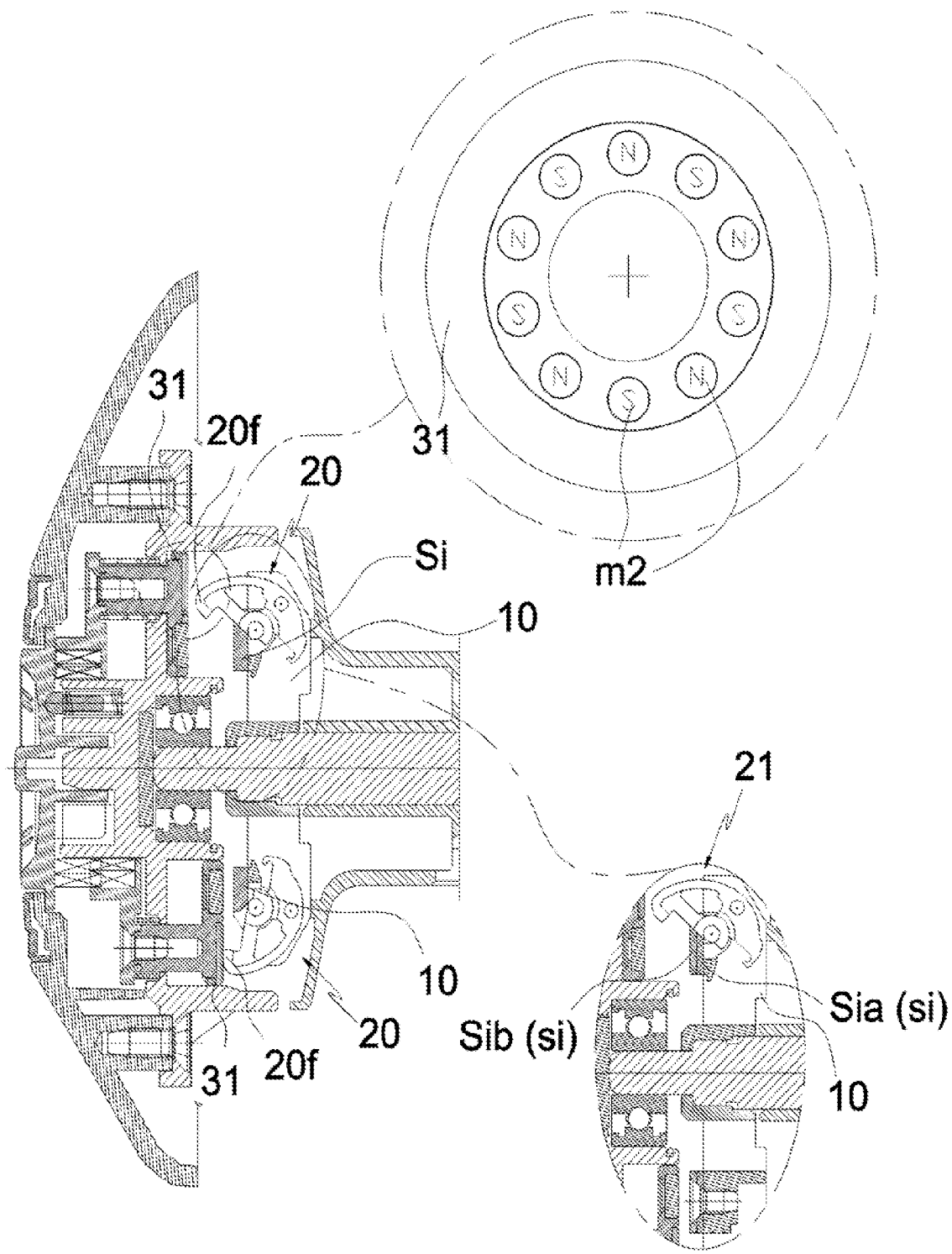
FIG. 6 is a view illustrating a permanent magnet of the precise centrifugal brake system according to the present invention.

Referring to FIG. 6 and the circle designated by the alternate long and short dash line at a right side of the upper portion of FIG. 4, the brake disc 30 may be configured such that small permanent magnets m2 are provided on the brake pad 31 in symmetric arrangement in the same manner as that of a technique proposed in Korean Utility Model Registration No. 20-0345064, filed by the applicant of the present invention on Mar. 4, 2004 [Braking plate operating structure for preventing backlash of spool of bait reel for fishing].

The support member 10 or the connection member Si is made of a non-magnetic conductive material such as aluminum or an aluminum alloy.

In this case, as the distance between the brake disc 30 and the support member 10 or the connection member Si is varied, the support member 10 or the connection member Si which is affected by lines of magnetic force of the permanent magnet m1, m2 functions as a braking panel.

Alternatively, the anti-backlash brake system using magnetic force may be embodied in such a way that the magnetic support member 10 or the connection member Si is made of a permanent magnet, and the brake disc, particularly, the brake pad 31, is made of a non-magnetic conductive material.

Comprehensively, the anti-backlash brake system using magnetic force is introduced in such a way that a permanent magnet is provided in one of the support member 10 and the brake disc 30 which can be adjusted in the distance therebetween, and the other is made of a non-magnetic conductive material.

The mounting drum 40 guides the assembly of the shaft A with other elements and makes interlocking operation between the controller 50 and the brake disc 30 smooth.

The mounting drum 40 includes three coupling protrusions 40a, each of which has a through hole, so that the three coupling protrusions 40a are respectively coupled to three insert protrusions Sn provided on a right side surface of the side cover Sc by bolts b.

With regard to the shaft A, a receiving recess 41 is formed in a central portion of the right side surface of the mounting drum 40. A protective pad Ap that has superior abrasion resistance and lubricant ability is fitted into the receiving recess 41. Thereafter, the left bearing B is disposed in the receiving recess 41, and a snap ring Br is fitted into an annular depression 41a, which is formed in a circumferential inner surface of the receiving recess 41, thus fixing the left bearing B in the receiving recess 41. Subsequently, the support end Aa of the shaft A is coupled into a central hole of the bearing B so that the support end Aa is rotatably supported by the bearing B.

With regard to the brake disc 30, the guide pin 37 of the auxiliary disc 33 to which the brake pad 31 is firmly fastened is inserted into a guide hole 47 formed in the receiving recess 41.

The guide pin 37 and the guide hole 47 constitute the guide means G which functions to make smooth movement of the brake disc 30 when the brake disc 30 is moved forwards or backwards by the controller.

Furthermore, the interlocking arm 35 provided on the left side surface of the auxiliary disc 33 of the brake disc 30 protrudes to the left from the left side surface of the mounting drum through a through hole 43.

With regard to the controller 50, a first shaft protrusion 45A and a second shaft protrusion 45B are provided on a central portion of the left side surface of the mounting drum 40.

The second shaft protrusion 45B that has a comparatively small outer diameter is coupled to a shaft hole 51A of a dial 51 which forms a part of the controller.

Further, the first shaft protrusion 45A which has a larger outer diameter than that of the second shaft protrusion 45B is inserted into a seating depression 53a of an intermediate member 53.

Meanwhile, as stated above, the core concept of the controller 50 is that the braking power can be precisely controlled in such a way that the distance between the brake shoes 20 and the brake pad 31 is adjusted by moving the brake disc 30.

Above all things, in terms of convenience in use, it is essential for the fishing reel to be configured such that the user can easily move the brake disc which is disposed inside the side cover Sc.

For this, the controller 50 has the dial 51. The dial 51 is disposed in a central coupling hole Sh of the side cover Sc so that it can be smoothly rotated in one place.

The coupling of the dial to the side cover and the rotation of the dial with respect to the side cover may be embodied in such a way that the dial is moved forwards or backwards in a threaded coupling manner.

More preferably, to enhance the durability, prevent foreign substances from entering the reel, and provide elegant appearance and characteristics of a high quality and high-end product, it is preferable that the dial 51 is rotated in one place.

Furthermore, it is preferable that the dial 51 is configured such that handling is smooth, the extent of the braking power can be indicated, the braking power can be precisely adjusted, and the dial 51 can be prevented from being undesirably rotated.

To achieve the above-mentioned purposes, an internal gear type multi-stop part Ss is formed on a circumferential inner surface of the coupling hole Sh of the side cover Sc, particularly, on a right (inner) portion of the circumferential inner surface of the coupling hole Sh to prevent the multi-stop part Ss from being exposed to the outside after the dial 51 has been assembled with the side cover Sc.

Furthermore, a C-shaped click-sound generation spring is provided in a rim of the dial 51, and includes a pair of arc-shaped elastic arms and a protrusion which is integrally provided between the arc-shaped arms. The C-shaped click-sound generation spring is mounted to the dial 51 by fitting the arc-shaped elastic arms into the circumferential inner surface of the rim of the dial 51.

The dial 51 has two protrusions 51a and 51b which limit rotation of the dial 51, that is, determine a start point and an end point of the rotation of the dial 51. The protrusion of the click-sound generation spring is disposed between the two protrusions 51a and 51b of the dial 51 and is brought into elastic contact with the multi-stop part Ss, thus generating a click sound. In this way, stepwise rotation of the dial can be embodied.

As necessary, a gear type multi-stop part may be formed around a circumferential outer surface of the dial 51, and a different shape of click-sound generation spring may be installed in the side cover Sc.

When the dial 51 is assembled with the side cover Sc, the dial 51 is inserted into the coupling hole Sh of the side cover Sc from the right side of the side cover Sc to the left side thereof.

As shown in an assembled sectional view of FIG. 1A and an exploded perspective view of FIG. 3, the dial 51 has a stepped circumferential outer surface. A right large-diameter part of the stepped outer surface is stopped by a circumferential portion that defines the side cover coupling hole Sh, whereby the dial 51 can be prevented from being removed to the left from the coupling hole.

Furthermore, the dial 51 includes a cylindrical sleeve which has a shaft hole 51A into which the second shaft protrusion 45B of the mounting drum 40 is inserted. An interlocking protrusion 51B is provided on a circumferential outer surface of the cylindrical sleeve. A grip 51k is provided on an outer surface of the dial 51.

The start and end protrusions 51a and 51b of the dial are brought into contact with a start and end protrusion p of the side cover Sc to limit an angle at which the dial can be rotated.

Meanwhile, in terms of separation of the function and facilitation of manufacture and assembly, it is preferable that the controller 50 includes the intermediate member 53 which moves the brake disc 30 forwards or backwards when the dial 51 coupled to the side cover Sc is rotated.

The intermediate member 53 has a spiral protrusion 53A on a circumferential outer surface thereof. The interlocking arm 35 of the auxiliary disc 33 of the brake disc 30 is locked to the spiral protrusion 53A by the locking protrusion 35a provided on the end of the interlocking arm 35.

The second shaft protrusion 45B of the mounting drum 40 is coupled into the shaft hole 51A of the dial 51 through a through hole 53h of the intermediate member 53.

The seating depression 53a into which the first shaft protrusion 45A of the mounting drum is inserted is formed around the through hole 53h.

Furthermore, an interlocking depression 53B is formed in a left side surface of the intermediate member 53. The interlocking protrusion 51B of the dial 51 is coupled into the interlocking depression 53B so that when the dial 51 is rotated, the rotating force is transmitted from the dial 51 to the intermediate member 53 through the interlocking protrusion 51B and the interlocking depression 53B.

In addition, balance protrusions 53b are provided on the left side surface of the intermediate member 53 at positions corresponding to two vertexes of a triangle formed by the two balance protrusions 53b and a protrusion that defines the interlocking depression 53B. The balance protrusions 53b function as spacers to maintain the distance between the right side surface of the dial 51 and the left side surface of the intermediate member 53 constant.

In the controller 50 having the above-mentioned construction, when the user rotates the dial 51, the protrusion of the click-sound generation spring engages with the multi-stop part Ss of the side cover Sc, thus making stepped and controlled rotation of the dial 51 possible, and generating a click sound.

Then, because the interlocking protrusion 51B of the dial which is rotated in one place is coupled to the interlocking depression 53B of the intermediate member 53, the intermediate member 53 which is provided around the first shaft protrusion 45A of the mounting drum 40 is also rotated in one place.

The rotation of the intermediate member 53 is converted into linear motion of the interlocking arm 35, that is, linear motion of the auxiliary disc 33 and the brake pad 31, because the locking protrusion 35a of the interlocking arm 35 is being brought into contact with a left side surface of the spiral protrusion 53A of the intermediate member 53.

Here, by virtue of the guide means G that includes the guide pin 37 of the auxiliary disc and the guide hole 47 of the mounting drum 40, the brake disc 30 can be smoothly and reliably moved forwards or backwards.

As the brake disc 30 moves forwards or backwards, the distance between the brake pad 31 and the brake shoes 20 is adjusted.

When the start protrusion 51a or the end protrusion 51b of the dial 51 comes into contact with a start surface p1 or an end surface p2 of the start and end protrusion p of the side cover Sc, left rotation or right rotation of the dial 51 is restricted. At this time, the forward or backward movement of the brake disc 30 is also restricted.

When the brake disc 30 is moved backwards to the leftmost position, in other words, when the distance between the brake pad 31 and the friction parts 20f of the brake shoes 20 is largest, the braking power of the precise centrifugal brake system preferably become zero.

As shown in FIG. 2A, when the distance between the brake pad 31 and the brake shoes 20, in detail, the friction parts 20f of the brake shoes 20, is comparatively short, contact points P1 at which the friction parts 20f of the brake shoes 20 make contact with the brake pad 31 are formed in a perimeter of the brake pad 31 which is comparatively far from the center of the brake pad 31. In this case, the braking power BP is comparatively large (strong).

On the other hand, as shown in FIG. 2B, when the distance between the brake pad 31 and the brake shoes 20, in detail, the friction parts 20f of the brake shoes 20, is comparatively long, the contact points P1 at which the friction parts 20f of the brake shoes 20 make contact with the brake pad 31 are formed at positions which are comparatively close to the center of the brake pad 31. Therefore, the braking power BP is comparatively small (weak).

As necessary, the controller which adjusts the distance between the brake disc 30 and the brake shoes 20 and precisely controls the braking power may be modified into a structure in which, rather than the brake disc 30, the support member provided with the brake shoes, is moved to control the braking power.

Meanwhile, in the precise centrifugal brake system according to the present invention, as shown in FIGS. 8 through 11, it is preferable that the brake shoe further includes a locking means which turns off the braking function.

The locking means can be embodied by a variety of methods to prevent the brake shoe from being swung.

Figure 8A:
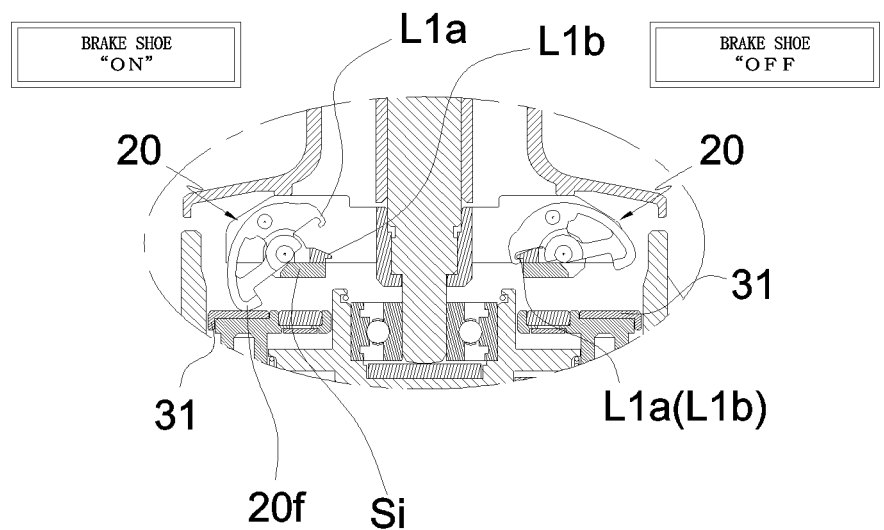
FIG. 8A through 11B are views illustrating a locking means according to the present invention.
Figure 8B:
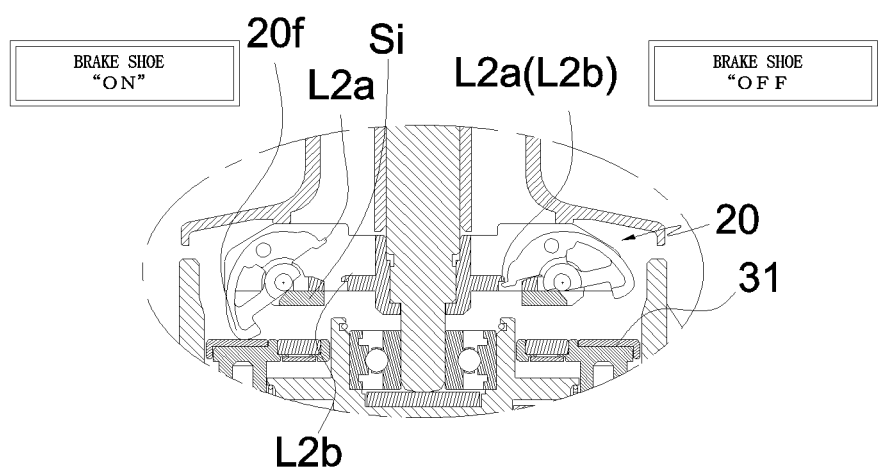

In detail, as shown in FIGS. 8A and 8B, a locking means L1a and L1b or L2a and L2b may be embodied in such a way that the heavy weight part of the brake shoe 20 is locked to the support member 10 in a protrusion-depression engagement manner. When the locking means enters the locked state, the brake shoe 20 is maintained in an upright state. In this case, even when the spool is rotating, the brake shoe 20 does not contact the brake pad 31.

Figure 9A:
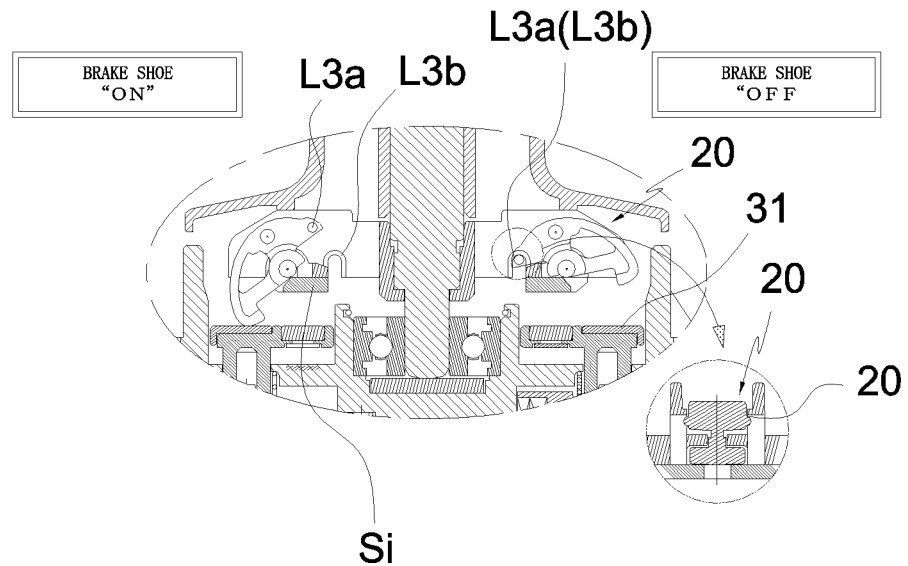
Figure 9B:
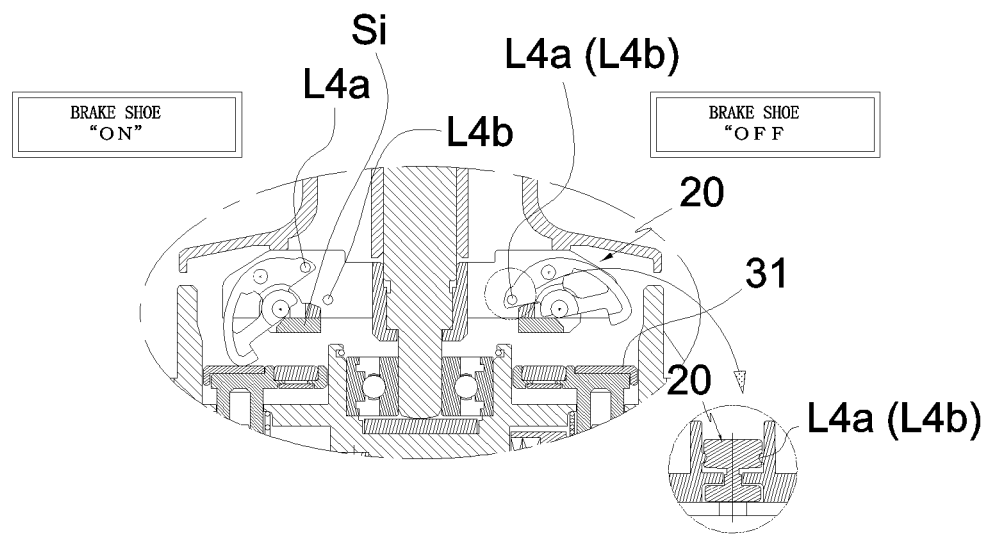

As shown in FIGS. 9A and 9B, the locking means according to the present invention may be modified into a locking means L3a and L3b or L4a and L4b that include a protrusion and a locking depression which are respectively provided on the heavy weight part of the brake shoe 20 and the support member 10.

Figure 10A:
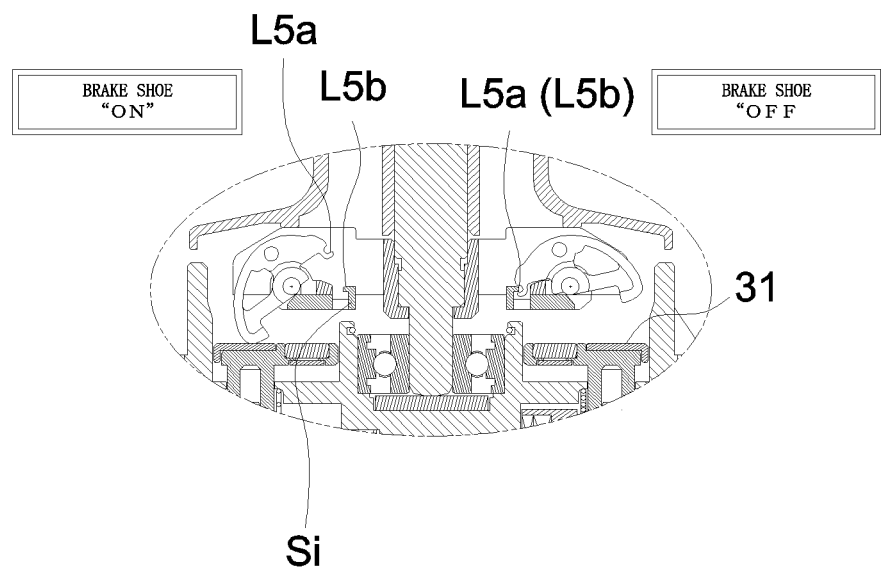
Figure 10B:
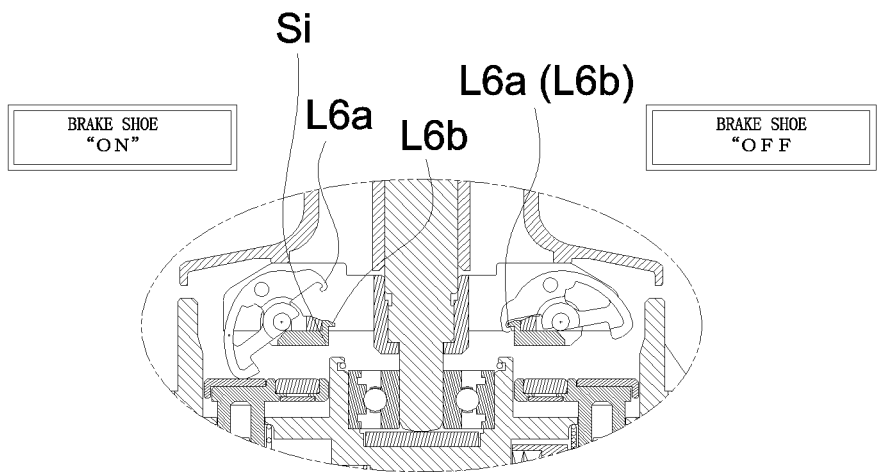

Furthermore, as shown in FIGS. 10A and 10B, the locking means according to the present invention may comprise a protrusion-depression engagement type locking means L5a and L5b or L6a and L6b which is provided on the heavy weight part of the brake shoe 20 and the connection member Si so that the brake shoe 20 can be selectively maintained in an upright state.

Figure 11A:
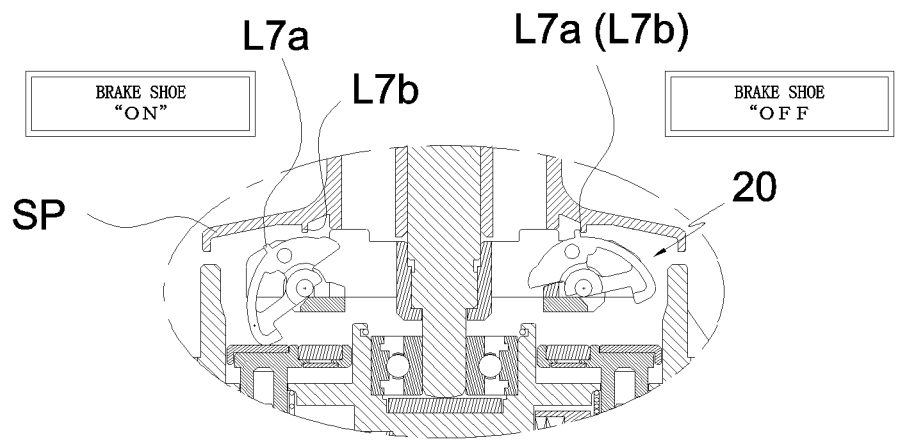

As shown in FIG. 11A, the locking means according to the present invention may be modified into a locking means L7a and L7b which includes a protrusion that protrudes outwards from the brake shoe 20 between the heavy weight part and the light weight part, and a locking protrusion that protrudes inwards from the spool.

Figure 11B:
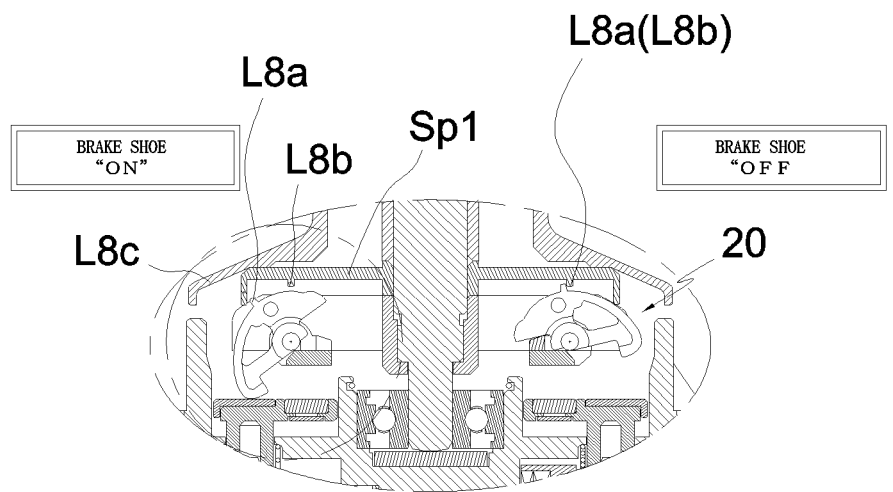

As shown in FIG. 11B, the locking means may be configured in such a way that a protrusion protrudes outwards from the brake shoe 20 between the heavy weight part and the light weight part and a locking protrusion protrudes inwards from a spool plate which functions as a cover of the spool.

To operate the locking means which can be embodied in various ways, the user opens the side cover and pushes the friction parts 20f of a desired number of brake shoes upwards such that the brake shoes enter the locked state through the locking means.

Figure 18:
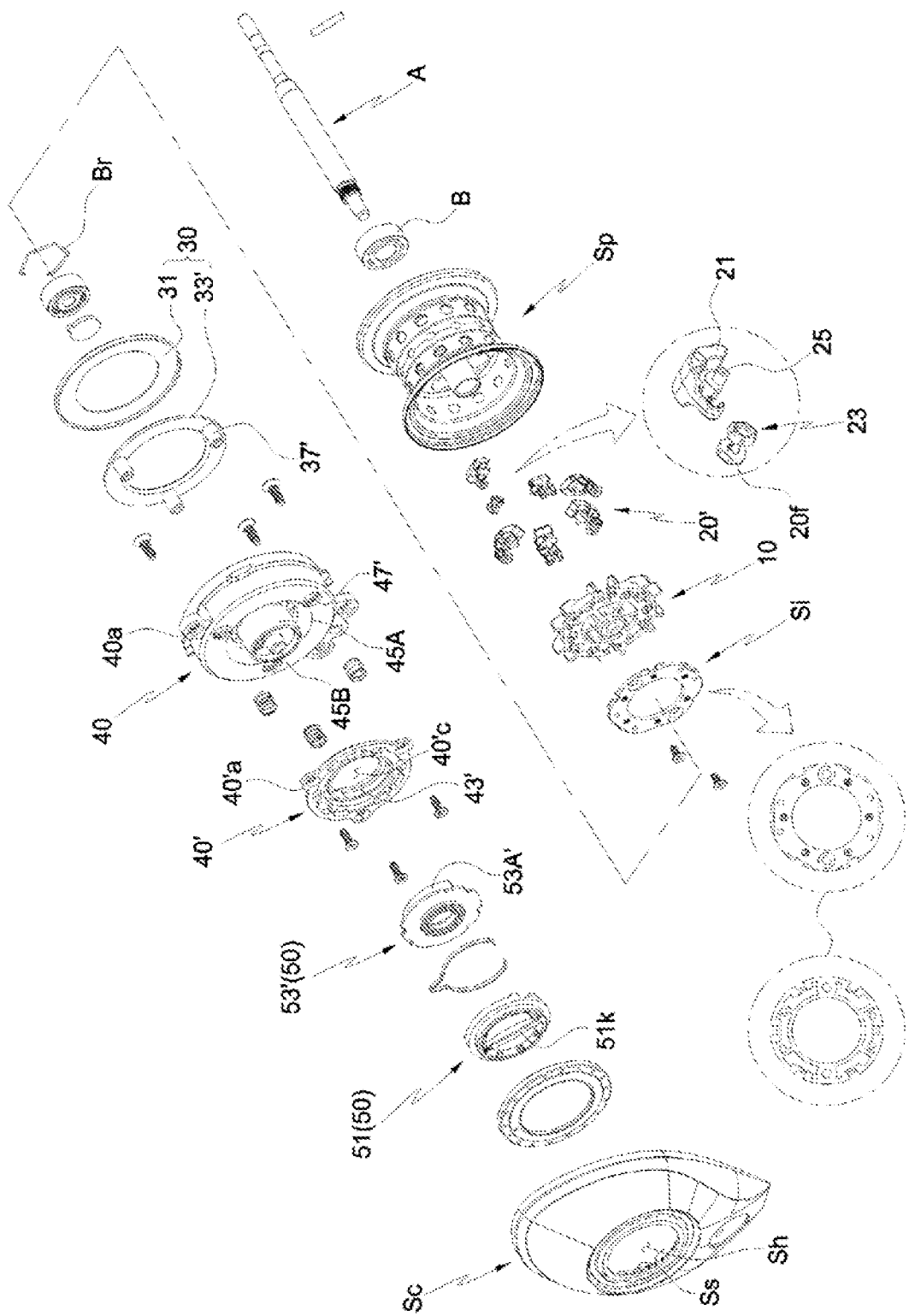

As shown in FIGS. 18 and 19, the second embodiment of the present invention provides a modification of a means for moving the brake disc 30 forwards or backwards using the controller 50, in other words, a modification of the intermediate member 53, thus making the forward or backward movement of the brake disc 30 smoother, and the manufacturing and assembling processes more easier.

For this, the intermediate member 53 is coupled to a dial to form a controller, and includes a spiral side wall 53A' which protrudes to the right from the intermediate member 53 such that the height of the spiral side wall 53A' varies to have a spiral shape.

A displacement drum 40' which has a spiral depression 43' corresponding to the spiral side wall 53A' is coupled to a mounting drum 40 in a sliding manner.

Preferably, the displacement drum 40' is coupled to an auxiliary disc 33 of the brake disc 30.

To make the forward or backward movement of the brake disc 30 smooth, the displacement drum 40' has in a central portion thereof an opening 40'c which is defined by a portion in which the spiral depression 43' is formed.

As described above, the intermediate member 53 is rotated in one place along with the dial 51.

Then, the position of a contact portion between the spiral side wall 53A' and the spiral depression 43' is varied by the rotation of the spiral side wall 53A', whereby the displacement drum 40' and the brake disc 30 are moved forwards or backwards.

That is, after the intermediate member 53 has been inserted into the opening 40'c, the displacement drum 40' is moved forwards or backwards by making contact between the spiral side wall 53A' and the spiral depression 43'.

For this, the auxiliary disc 33 includes a guide pin 37 which has an insert hole into which a bolt or the like is coupled.

The mounting drum 40 has a guide hole 47 through which the guide pin 37 passes.

The displacement drum 40' has a through hole 40'a into which a fastening member such as a bolt is inserted to couple the displacement drum 40' to the guide pin 37. Thus, the auxiliary disc 33 and the displacement drum 40' are coupled to each other by bolting.

As the intermediate member is rotated, an assembly of the brake disc and the displacement drum is moved forwards or backwards.

The guide hole and the guide pin function as a guide means for guiding linear movement of the assembly of the brake disc and the displacement drum forward or backward.

Furthermore, a coil spring is provided inside the guide hole 47 of the mounting drum 40, that is, between the through hole 40'a of the displacement drum 40' and the guide pin 37 of the auxiliary disc 33.

When the brake disc including the auxiliary disc is moved forwards or backwards, they are biased to their original position by the coil spring.

In more detail, the coil spring elastically supports the displacement drum on the mounting drum.

When the intermediate member is rotated in one direction and the displacement drum and the brake disc are moved inwards, that is, rightwards, the spring coil is contracted and the elastic force of the coil spring is applied to the displacement drum and the brake disc in the opposite direction.

In this state, when the intermediate member is rotated in the other direction, the displacement drum and the brake disc are moved outwards, that is, leftwards, by the elastic force of the coil spring.

In the description of the second embodiment of the present invention, the constructions of a controller 50, a side cover Sc, a click-sound generation spring, a connection member Si, a permanent magnet and a support member 10 and the connection relationship among them will be omitted, because they are almost the same as those of the first embodiment, so that those skilled in the art can easily embody them.

Furthermore, in the above-mentioned description, although the well known techniques associated with various sphere structures of the fishing reel have been omitted, those skilled in the art will be able to easily deduce and embody them.

While the preferred embodiments of the fishing reel and the precise centrifugal brake system according to the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fishing reel, comprising:
   a frame;
   a shaft coupled to the frame;
   a spool provided on the shaft to allow a fishing line to be wound around the spool; and
   a centrifugal brake system, comprising:
      a support member provided on one side of the spool, the support member being rotated in conjunction with the spool;
      a plurality of brake shoes radially coupled to the support member by respective shaft pins disposed in the support member, at least two shaft pins disposed at different distances from a center axis of the shaft, each of the brake shoes having a heavy weight part and a light weight part on opposite sides based on the corresponding shaft pin to have a weight eccentric structure, wherein when the spool is rotated, the brake shoes are swung by centrifugal force such that the heavy weight parts of the brake shoes are swung away from the shaft and the light weight parts are swung towards the shaft;
      a brake disc coupled to the frame;
      a connection member disposed between the support member and the brake disc;
      a plurality of slot-type stoppers provided in the connection member, each of the slot-type stoppers limiting a swing displacement of one of the brake shoes, at least two of the slot-type stoppers having different slot depths such that the two corresponding brake shoes have different swing displacements;
      a plurality of planar portions formed in between the slot-type stoppers in the connection member, the planar portions preventing the brake shoes from swinging when the support member is rotated with respect to the connection member; and
      a controller controlling braking power by adjusting a distance between the brake disc and the brake shoes, thus controlling braking power.

2. The fishing reel as set forth in claim 1, a side cover mounted to the frame, wherein the controller comprises a dial coupled to the side cover, and the dial comprises two protrusions that defines a start point and an end point of rotation of the dial.

3. The fishing reel as set forth in claim 2,
   wherein the controller further comprises an intermediate member that is moved when the dial is rotated and thereby causing the brake disc to move forwards or backwards so that a distance between the brake disc and the brake shoes is adjusted,
   wherein an interlocking depression is formed in a side surface of the intermediate member, and an interlocking protrusion of the dial is configured to couple to the interlocking depression so that when the dial is rotated, rotating force is transmitted from the dial to the intermediate member through the interlocking protrusion and the interlocking depression,
   wherein a plurality of balance protrusions are provided on the side surface of the intermediate member at positions corresponding to two vertexes of a triangle formed by two balance protrusions and a protrusion that defines the interlocking depression, and the balance protrusions are configured to function as spacers that maintain a constant distance between a side surface of the dial and the side surface of the intermediate member.

4. The fishing reel as set forth in claim 3, wherein the intermediate member comprises a spiral protrusion on a circumferential outer surface thereof, and the brake disc comprises an interlocking arm coming into contact with the spiral protrusion such that the interlocking arm is interlocked with the spiral protrusion.

5. The fishing reel as set forth in claim 1, wherein the brake disc comprises guide means for guiding the brake disc when moved forwards or backwards by the controller.

6. The fishing reel as set forth in claim 1, wherein each of the brake shoes comprises locking means for turning off a braking function of the centrifugal braking system.

7. The finishing reel as set forth in claim 6, wherein the locking means is configured to lock the heavy weight part of the brake shoe to a protrusion of the supporting member.

8. The finishing reel as set forth in claim 6, wherein the locking means is configured to lock the heavy weight part of the brake shoe to a protrusion of the connection member.

9. The finishing reel as set forth in claim 6, wherein the locking means comprises a protrusion disposed between the heavy weight part and the light weight part of the brake shoe to engage with a protrusion of the spool.

10. The fishing reel as set forth in claim 1, further comprising;
- a magnetic type anti-backlash brake system configured in such a way that a permanent magnet is provided on one of the support member and the brake disc, and the other of the support member and the brake disc is made of a nonmagnetic conductive material.

* * * * *